12) United States Patent
Tsujimoto et al.

(10) Patent No.: US 7,514,906 B1
(45) Date of Patent: Apr. 7, 2009

(54) AUTOMOTIVE ROTARY ELECTRICAL APPARATUS

(75) Inventors: Katsuya Tsujimoto, Chiyoda-ku (JP);
Shogo Matsuoka, Chiyoda-ku (JP);
Takamasa Asai, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 12/054,994

(22) Filed: Mar. 25, 2008

(30) Foreign Application Priority Data

Nov. 2, 2007  (JP) .............................. 2007-286405

(51) Int. Cl.
H02P 9/00 (2006.01)
(52) U.S. Cl. .............................. 322/37; 322/11; 322/13; 322/25; 290/40 A; 290/40 C; 290/40 R
(58) Field of Classification Search .................... 322/11, 322/13, 25, 37; 290/40 A, 40 C, 40 R
See application file for complete search history.

(56) References Cited

U.S. PATENT DOCUMENTS 7,345,457 B2 *  3/2008  Garces et al. .................. 322/59
7,368,893 B2 *  5/2008  Tsuzuki ........................ 322/28

FOREIGN PATENT DOCUMENTS

JP      2006-288082 A    10/2006

* cited by examiner

Primary Examiner—Nicholas Ponomarenko
Assistant Examiner—Iraj A Mohandesi
(74) Attorney, Agent, or Firm—Sughrue Mion, PLLC

(57) ABSTRACT

An automotive rotary electrical apparatus with less than four switching control elements capable of blocking a field current while preventing breakage of the switching control elements in response to a malfunction in a feeder circuit for a field coil is proposed. First and second switching control elements controlled by first and second control signals, and first and second diode elements are used. The field control circuit switches the first control signal to the on-level signal while keeping the second control signal as the on-level signal, then switches the second control signal to the off-level signal while keeping the first control signal as the on-level signal, and further switches the first control signal to the off-level signal while keeping the second control signal to the off-level signal, when a short-to-power malfunction of the positive terminal or a short-circuit malfunction of the first switching control element occurs in the feeder circuit for the field coil.

18 Claims, 21 Drawing Sheets

AUTOMOTIVE ROTARY ELECTRICAL APPARATUS

BACKGROUND OF THE INVENTION

1. Technical Field

The present invention relates to an automotive rotary electrical apparatus mounted on a vehicle such as an automobile, and in particular to an automotive rotary electrical apparatus provided with a rotary electric machine having an armature coil and a field coil and coupled to an engine mounted on the vehicle, and a control device having a battery terminal connected to a positive terminal of an in vehicle battery, a common potential terminal connected to a common potential point, and positive and negative field terminals connected to the field coil.

2. Related Art

The control device in the automotive rotary electrical apparatus of this kind includes a field drive circuit forming a feeder circuit for the field coil, and a field control circuit for controlling the field drive circuit. In the case in which the rotary electric machine is configured as a generator, the field drive circuit generally includes only one switching control element and only one diode element. The switching control element is connected between the battery terminal and the positive field terminal, and the negative field terminal is connected to the common potential point. The field coil is supplied with electricity from the in-vehicle battery via the switching control element. The field current flowing through the field coil is controlled based on an on/off operation of the switching control element, thus an output voltage of the armature coil of the generator is controlled. The diode element is connected between the positive field terminal and the negative field terminal in parallel to the field coil so that the cathode thereof is connected to the positive field terminal. The diode element passes a circulating field current in accordance with a transient voltage caused in the field coil to protect the switching control element when the switching control element is turned off.

However, in the field drive circuit described above including one switching control element and one diode element, when a short-to-power malfunction, namely a malfunction that the positive field terminal has direct contact with the battery terminal, is caused in the field coil, or a short-circuit malfunction is caused in the switching control element, blocking of the field current flowing through the field coil is not achieved.

JP-2006-288082A (Document 1) discloses a control circuit for an automotive generator having a field drive circuit formed of an H bridge using four switching control elements. The H-bridge has the switching control elements respectively connected to four side arms thereof, and the field coil is connected between a midpoint of one pair of switching control elements and a midpoint of the other pair of switching control elements. By using the H-bridge, when a malfunction is caused in either one of the four switching control elements, the malfunction can be avoided.

However, in the control device of the automotive generator described in the Document 1, since the four switching control elements are used, the control therefore becomes complicated.

SUMMARY OF THE INVENTION

In the present invention, there is proposed an improved automotive rotary electrical apparatus using more than one and less than four switching control elements and capable, when either one of the short-to-power malfunction of the positive field terminal and the short-circuit malfunction of the switching control element connected between the battery terminal and the positive field terminal is caused, of blocking the field current flowing through the field coil while protecting other switching control elements.

An automotive rotary electrical apparatus according to a first aspect of the invention includes a rotary electric machine having an armature coil and a field coil, and coupled to an engine mounted on a vehicle, and a control device having a battery terminal connected to a positive terminal of an in-vehicle battery, a common potential terminal connected to a common potential point, a positive field terminal and a negative field terminal connected to the field coil, a power conversion circuit connected between the battery terminal and the common potential terminal, and for performing power conversion between the in-vehicle battery and the armature coil, a field drive circuit connected between the battery terminal and the common potential terminal, and for forming a feeder circuit for the field coil, the feeder circuit including the positive field terminal and the negative field terminal, and a field control circuit for controlling the field drive circuit.

In this automotive rotary electrical apparatus, the field drive circuit has a first switching control element connected between the battery terminal and the positive field terminal, a second switching control element connected between the negative field terminal and the common potential terminal, a first diode element connected between the positive field terminal and the common potential terminal so that a cathode of the first diode element is connected to the positive field terminal, and a second diode element connected between the battery terminal and the negative field terminal so that a cathode of the second diode element is connected to the battery terminal. And the field control circuit is configured so as to supply the first switching control element with a first control signal including an on-level signal for turning on the first switching control element and an off-level signal for turning off the first switching control element, and to supply the second switching control element with a second control signal including an on-level signal for turning on the second switching control element and an off-level signal for turning off the second switching control element.

In the automotive rotary electrical apparatus, in a case in which the feeder circuit for the field circuit is normal, the field control circuit controls the second switching control element to be an always-on state by controlling the second control signal to be kept as the on-level signal, and performs on/off control of the first switching control element at a controlled duty ratio by controlling the first control signal to repeat alternating between the on-level signal and the off-level signal at the controlled duty ratio, and in a case in which one of a short-to-power malfunction of the positive field terminal and a short-circuit malfunction of the first switching control element has occurred in the feeder circuit for the field coil, the field control circuit switches the first control signal to the on-level signal while keeping the second control signal as the on-level signal, then switches the second control signal to the off-level signal while keeping the first control signal as the on-level signal, and further switches the first control signal to the off-level signal while keeping the second control signal to the off-level signal.

Further, an automotive rotary electrical apparatus according to a second aspect of the invention includes:

a rotary electric machine having an armature coil and a field coil, and coupled to an engine mounted on a vehicle; and
a control device having
a battery terminal connected to a positive terminal of an in-vehicle battery,
a common potential terminal connected to a common potential point,
a positive field terminal and a negative field terminal connected to the field coil,
a power conversion circuit connected between the battery terminal and the common potential terminal, and for performing power conversion between the in-vehicle battery and the armature coil,
a field drive circuit connected between the battery terminal and the common potential terminal, and for forming a feeder circuit for the field coil, the feeder circuit including the positive field terminal and the negative field terminal, and
a field control circuit for controlling the field drive circuit.

In the automotive rotary electrical apparatus, the field drive circuit has a first switching control element connected between the battery terminal and the positive field terminal, a second switching control element connected between the negative field terminal and the common potential terminal, a first diode element connected between the positive field terminal and the common potential terminal so that a cathode of the first diode element is connected to the positive field terminal, and a second diode element connected between the positive field terminal and the negative field terminal so that a cathode of the second diode element is connected to the positive field terminal. And the field control circuit is configured so as to supply the first switching control element with a first control signal including an on-level signal for turning on the first switching control element and an off-level signal for turning off the first switching control element, and to supply the second switching control element with a second control signal including an on-level signal for turning on the second switching control element and an off-level signal for turning off the second switching control element, Also, in this rotary electrical apparatus, in a case in which the feeder circuit for the field coil is normal, the field control circuit controls the second switching control element to be an always-on state by controlling the second control signal to be kept as the on-level signal, and performs on/off control of the first switching control element at a controlled duty ratio by controlling the first control signal to repeat alternating between the on-level signal and the off-level signal at the controlled duty ratio, and in a case in which one of a short-to-power malfunction of the positive field terminal and a short-circuit malfunction of the first switching control element has occurred in the feeder circuit for the field coil, the field control circuit controls the first control signal to be kept as the off-level signal, and then switches the second control signal to the off-level signal while keeping the first control signal as the off-level signal.

In the automotive rotary electrical apparatus according to the first and second aspects of the invention, the first and second switching control elements and the first and second diode elements are used, and the field current flowing through the field coil can be blocked while protecting the second switching control element in the case in which any of the short-to-power malfunction of the positive field terminal and the short-circuit malfunction of the first switching control element occurs.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Some embodiments of the present invention will hereinafter be described with reference to the accompanying drawings.

First Embodiment

Figure 1:
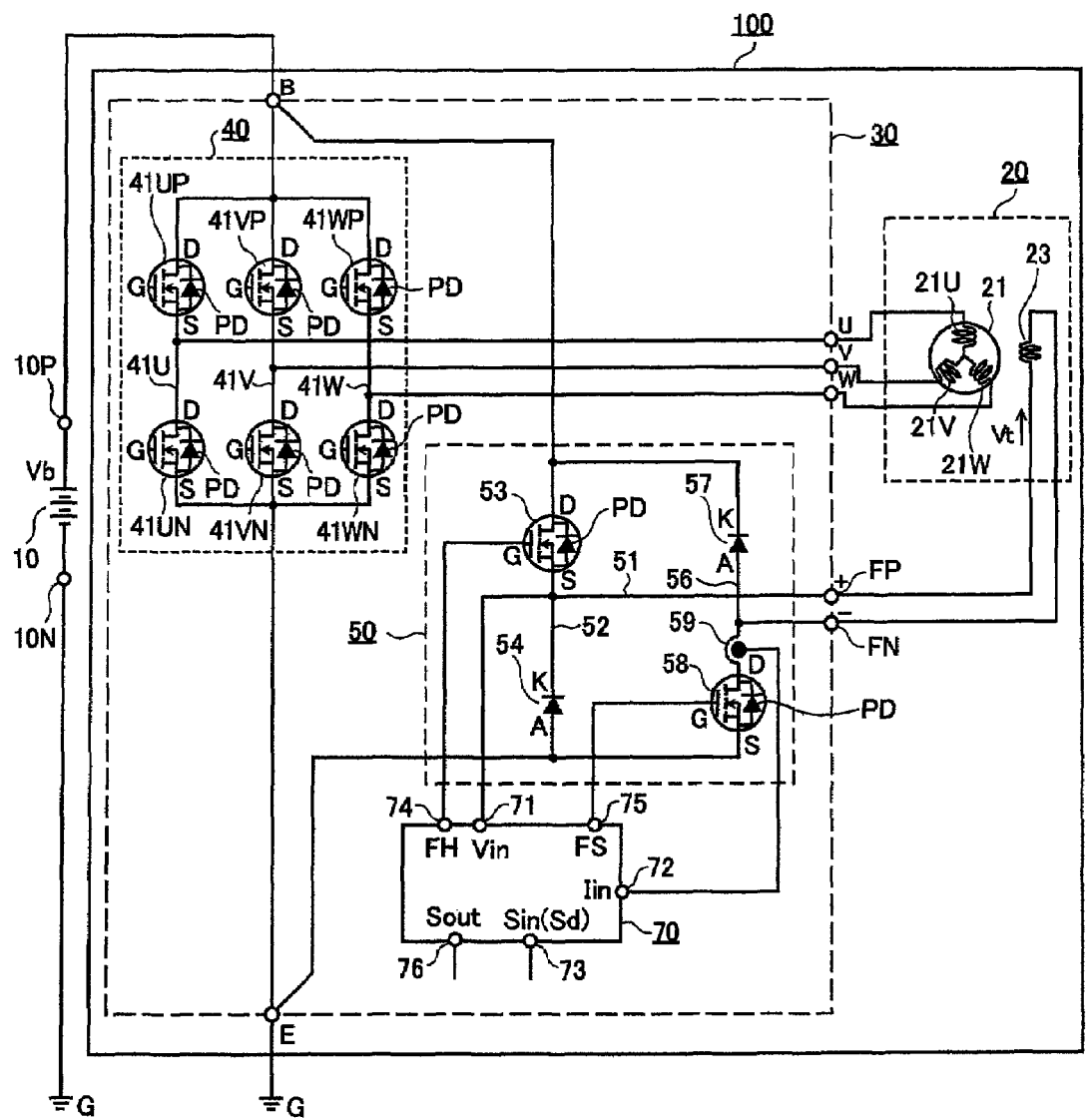
FIG. 1 is an electric diagram showing a first embodiment of the automotive rotary electrical apparatus according to the present invention.

FIG. 1 is an electric diagram showing the first embodiment of the automotive rotary electrical apparatus according to the present invention.

An automotive rotary electrical apparatus 100 of the first embodiment is mounted on a vehicle such as an automobile and provided with a rotary electric machine 20 and a control device 30, and the control device 30 is connected to an in-vehicle battery 10. The in-vehicle battery 10 is, for example, a 12-volt or 24-volt battery. The in-vehicle battery 10 has a positive terminal 10P and a negative terminal 10N, and the negative terminal 10N is connected to a common potential point G such as a body of the vehicle.

The rotary electric machine 20 is configured as, for example, an electric motor generator functions as both the electric motor and a generator. When the rotary electric machine 20 is used as an electric motor, the rotary electric machine 20 functions as a starter for starting the engine mounted on the vehicle. When the rotary electric machine 20 is used as a generator, the rotary electric machine 20 charges the in-vehicle battery 10 and supplies various loads in the vehicle with electricity.

The rotary electric machine 20 has an armature coil 21 and a field coil 23. The armature coil 21 is disposed to, for example, a stator of the rotary electric machine 20, and the field coil 23 is disposed to the rotor thereof. The armature coil 21 is configured as, for example, a three-phase armature coil including a U-phase coil 21U, a V-phase coil 21V, and a W-phase coil 21W. The U-phase coil 21U, the V-phase coil 21V, and the W-phase coil 21W are connected to each other to form a three-phase star connection. The rotor of the rotary electric machine 20 is coupled to the engine mounted on the vehicle, drives the engine when used as the starter motor, and is driven by the engine when used as the generator.

The control device 30 has a B-terminal, an E-terminal, a U-terminal, a V-terminal, a W-terminal, an FP-terminal, and an FN-terminal. The B-terminal is a battery terminal, and directly connected to the positive terminal 10P of the in-vehicle battery 10. The E-terminal is a common potential terminal, and connected directly to the common potential point G common to the negative terminal 10N of the in-vehicle battery 10. The U-terminal, the V-terminal, and the W-terminal are connected to the armature coil 21 of the rotary electric machine 20. The U-terminal, the V-terminal, and the W-terminal are connected directly to the U-phase coil 21U, the V-phase coil 21V, and the W-phase coil 21W of the armature coil 21, respectively. The FP-terminal is a positive field terminal, and the FN-terminal is a negative field terminal. The positive field terminal FP and the negative field terminal FN are respectively connected to the positive terminal and the negative terminal of the field coil 23 of the rotary electric machine 20.

The control device 30 includes a power converter circuit 40, a field drive circuit 50, and a field control circuit 70. The power converter circuit 40 converts direct-current power from the in-vehicle battery 10 into alternating-current power and supplies the armature coil 21 with the alternating-current power when the rotary electric machine 20 is used as an electric motor. Further, the power converter circuit 40 converts alternating-current power from the armature coil 21 into direct-current power, and supplies the in-vehicle battery 10 with the direct-current power when the rotary electric machine 20 is used as a generator.

The power converter circuit 40 specifically includes a U-phase cable 41U, a V-phase cable 41V, and a W-phase cable 41W, which are connected in parallel to each other between the battery terminal B and the common potential terminal E. The U-phase cable 41U includes two switching control elements 41UP, 41UN connected in series with each other, the V-phase cable 41V includes two switching control elements 41VP, 41VN connected in series with each other, and W-phase cable 41W includes two switching control elements 41WP, 41WN connected in series with each other. A midpoint between the switching control elements 41UP, 41UN is connected directly to the U-terminal, and thus connected to the U-phase coil 21U. A midpoint between the switching control elements 41VP, 41VN is connected directly to the V-terminal, and thus connected to the V-phase coil 21V. Further, a midpoint between the switching control elements 41WP, 41WN is connected directly to the W-terminal, and thus connected to the W-phase coil 21W. Each of the switching control elements 41UP, 41UN, 41VP, 41VN, 41WP, and 41WN is formed, for example, of an N-channel power MOSFET, and performs an ON/OFF operation in accordance with a gate control signal supplied to each of the respective gates, thereby performing necessary power conversion. It should be noted that each of the semiconductor chips respectively forming the switching control elements 41UP, 41UN, 41VP, 41VN, 41WP, and 41WN has a protective diode element PD integrally built therein.

The field drive circuit 50 is connected between the battery terminal B and the common potential terminal E to form a feeder circuit 51 for the field coil 23 extending from the battery terminal B to the common potential terminal E via the field coil 23. The field drive circuit 50 has a first cable 52 and a second cable 56 connected in parallel to each other between the battery terminal B and the common potential terminal E. The first cable 52 includes a first switching control element 53 and a first diode element 54 connected in series with each other. The second cable 56 includes a second diode element 57 and a second switching control element 58 connected in series with each other. Each of the first and second switching control elements 53, 58 is formed, for example, of an N-channel power MOSFET, and has a drain D, a source S, and a gate G. Each of the first and second diode elements 54, 57 has an anode A and a cathode K. Each of semiconductor chips respectively forming the first and second switching control elements 53, 58 has a protective diode element PD integrally built therein. The protective diode elements PD are connected to the sources S of the switching control elements 53, 58 at the anodes thereof, and to the drains D of the switching control elements 53, 58 at the cathode thereof, respectively.

The first switching control element 53 is connected between the battery terminal B and the positive field terminal FP, and has a drain D directly connected to the battery terminal B and a source S directly connected to the positive field terminal FP. The first diode element 54 is connected between the positive field terminal FP and the common potential terminal E, and has an anode A directly connected to the common potential terminal E and a cathode K directly connected to both the positive field terminal FP and the source S of the first switching control element 53.

The second diode element 57 is connected between the battery terminal B and the negative field terminal FN, and has a cathode K directly connected to the battery terminal B and an anode A directly connected to the negative field terminal FN. The second switching control element 58 is connected between the negative field terminal FN and the common potential terminal E, and has a drain D connected to the negative field terminal FN via a field current sensor 59 and a source S directly connected to the anode A of the first diode element 54 and the common potential terminal E.

The field control circuit 70 is formed, for example, of a microcomputer, and has input terminals 71, 72, and 73, and output terminals 74, 75, and 76. The input terminal 71 is connected to the positive field terminal FP, and field voltage information Vin representing a field voltage applied to the positive field terminal FP is input to the input terminal 71. The input terminal 72 is connected to the field current sensor 59, and field current information Iin representing a field current flowing through the field coil 23 is input to the input terminal 72. A first control signal FH is generated on the output terminal 74. The output terminal 74 is connected to a gate G of the first switching control element 53, and ON/OFF control of the first switching control element 53 is performed based on the first control signal FH. A second control signal FS is generated on the output terminal 75. The output terminal 75 is connected to a gate G of the second switching control element 58, and ON/OFF control of the second switching control element 58 is performed based on the second control signal FS.

The input terminal 73 and the output terminal 76 are connected to a host engine control unit (ECU) configured with a microcomputer. An input signal Sin from the engine control unit is input to the input terminal 73, and the input signal Sin includes a duty ratio designation signal Sd to the field coil 23. An output signal Sout from the field control circuit 70 to the engine control unit is generated on the output terminal 76. The field control circuit 70 generates the first control signal FH on the output terminal 74 based on the field voltage information Vin, the field current information Iin, and the duty ratio designation signal Sd, and further, generates the second control signal FS based on the field voltage information Vin and the field current information Iin.

Figure 2:
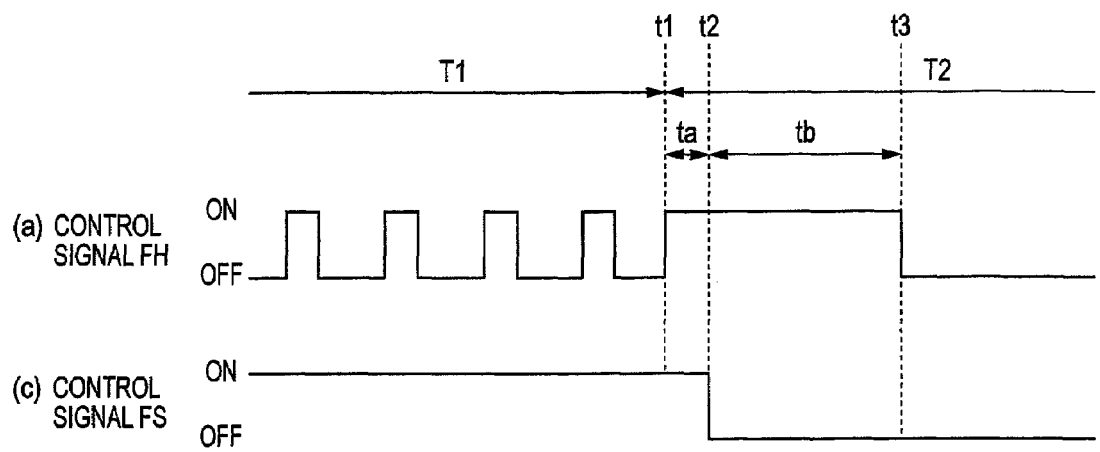
FIG. 2 is a signal waveform diagram showing a variation in a control signal in the case in which a first type malfunction is caused in the first embodiment.

FIG. 2 shows variations in the first and second control signals FH, FS in the case in which a first type malfunction has occurred in the feeder circuit 51 for the field coil 23 in the first embodiment. In FIG. 2, a waveform (a) shows the first control signal FH, and a waveform (b) shows the second control signal FS. The horizontal axis of FIG. 2 is a time axis common to the first and second control signals FH, FS. A term T1 represents a normal term in which the feeder circuit 51 for the field coil 23 is normal, and a term T2 represents an abnormal term in which the first type malfunction is caused in the feeder circuit 51. In the normal term T1, duty control of the field coil 23 is performed based on the duty ratio designation signal Sd. The first type malfunction denotes any one of the short-to-power malfunction in the positive field terminal FP of the field coil 23 and the short-circuit malfunction of the first switching control element 53. The short-to-power malfunction of the positive field terminal FP denotes a state in which the positive field terminal FP or wiring connected thereto has direct contact with the positive terminal 10P of the in-vehicle battery 10. The short-circuit malfunction of the first switching control element 53 denotes a short circuit between the drain D and the source S thereof.

In the abnormal term T2, three timings t1, t2, and t3 are shown. The timing t1 shown in FIG. 2 is a start timing of the abnormal term T2, and the transition from the normal term T1 to the abnormal term T2 occurs with the timing t1. The timing t2 is a timing a predetermined time ta delayed from the timing t1, and the timing t3 is a timing a predetermined time tb delayed further from the timing t2.

Figure 3:
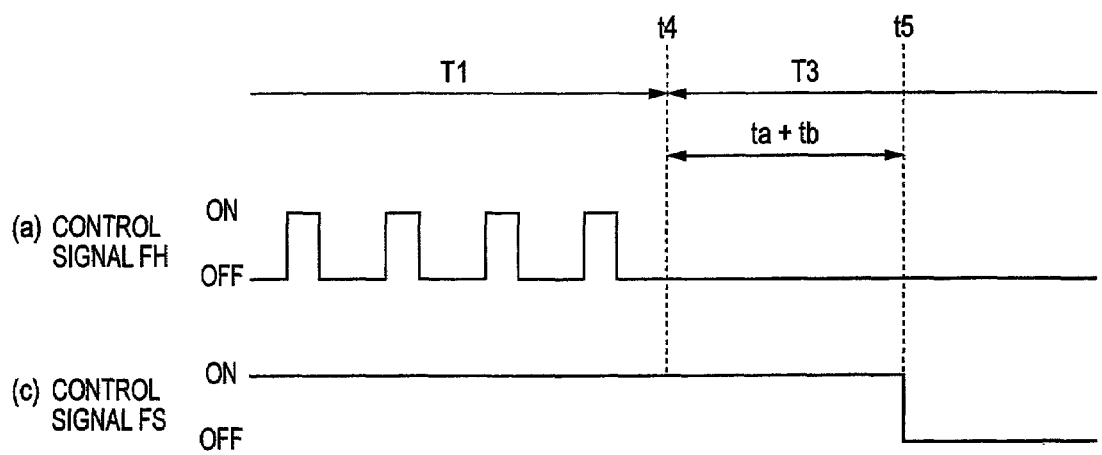
FIG. 3 is a signal waveform diagram showing a variation in a control signal in the case in which a second type malfunction is caused in the first embodiment.

FIG. 3 shows variations in the first and second control signals FH, FS in the case in which a second type malfunction occurs in the feeder circuit 51 for the field coil 23 in the first embodiment. In FIG. 3, a waveform (a) shows the first control signal FH, and a waveform (b) shows the second control signal FS. The horizontal axis of FIG. 3 is a time axis common to the first and second control signals FH, FS. A term T1 represents a normal term in which the feeder circuit 51 for the field coil 23 is normal, and a term T3 represents an abnormal term in which the second type malfunction is caused in the feeder circuit 51. The second type malfunction denotes the short-to-ground malfunction of the negative field terminal FN or the wiring connected thereto, which is a malfunction that the negative field terminal FN or the wiring connected thereto has direct contact with the common potential point G. In the abnormal term T3, timings t4, t5 are shown. The timing t4 is a start timing of the abnormal term T3, and the transition from the normal term T1 to the abnormal term T3 occurs with the timing t4.

The first control signal FH is a field drive signal supplied to the gate G of the first switching control element 53, and includes an on-level signal ON and an off-level signal OFF. The on-level signal ON of the first control signal FH is, for example, a high-level signal, and when the on-level signal of the first control signal FH is supplied to the first switching control element 53, the first switching control element 53 is turned on. The off-level signal OFF of the first control signal FH is, for example, a low-level signal, and when the off-level signal OFF of the first control signal FH is supplied to the first switching control element 53, the first switching control element 53 is turned off.

The second control signal FS is a fail-safe signal supplied to the gate G of the second switching control element 58, and includes the on-level signal ON and the off-level signal OFF. The on-level signal ON of the second control signal FS is, for example, a high-level signal, and when the on-level signal ON of the second control signal FS is supplied to the second switching control element 58, the second switching control element 58 is turned on. The off-level signal OFF of the second control signal FS is, for example, a low-level signal, and when the off-level signal OFF of the second control signal FS is supplied to the second switching control element 58, the second switching control element 58 is turned off.

Then, an operation of the first embodiment shown in FIG. 1 will now be explained with reference to FIGS. 2 and 3. Firstly, the operation in the normal term T1 shown in FIGS. 2 and 3 will be explained. In the normal term T1, the field control circuit 70 detects that the no malfunction has been caused in the feeder circuit 51 for the field coil 23 based on the field voltage information Vin and the field current information Iin, and as a result, the on-level signals ON and the off-level signals OFF are repeatedly generated on the first control signal FH at a designated duty ratio based on the duty ratio designation signal Sd included in the input signal Sin, and the second control signal FS stays in the on-level signal ON. The field drive circuit 50 performs an ON/OFF control of the field coil 23 at a controlled duty ratio based on the first and second control signals FH, FS.

Since the second control signal FS maintains to be the on-level signal ON in the normal term T1, the second switching control element 58 is set always-on. When the first control signal FH becomes the on-level signal ON, the first switching control element 53 is also turned on, thus both of the first and second switching control elements 53, 58 are turned on. In this state, the field current flows through a circuit extending from the battery terminal B to the common potential terminal E via the first switching control element 53, the positive field terminal FP, the field coil 23, the negative field terminal FN, the field current sensor 59, and the second switching control element 58. As a result, the drive force of the rotary electric machine 20 is increased when the rotary electric machine 20 is driven as an electric motor, and the generated voltage of each of the phase coils 21U, 21V, and 21W of the armature coil 21 is raised when the rotary electric machine 20 is driven as a generator.

In the normal term T1, when the first control signal FH becomes the off-level signal, the first switching control element 53 is turned off. Although the second switching control element 58 is set always-on, the field current supplied from the first switching control element 53 to the field coil 23 is blocked when the first switching control element 53 is turned off. As a result, the drive force of the rotary electric machine 20 is decreased when the rotary electric machine 20 is driven as an electric motor, and the generated voltage of each of the phase coils 21U, 21V, and 21W of the armature coil 21 is lowered when the rotary electric machine 20 is driven as a generator. By turning off the first switching control element 53, the transient voltage Vt with a polarity directed from the positive field terminal FP to the negative field terminal FN is caused in the field coil 23. In the normal term T1, since the second switching control element 58 is set always-on, based on the transient voltage Vt, the transient voltage Vt is prevented from being concentrated into the first switching control element 53 by the circulating field current flowing through the circuit connecting the positive field terminal FP, the field coil 23, the negative field terminal FN, the field current sensor 59, the second switching control element 58, and the first diode element 54, so as to start from the positive field terminal FP and return to the positive field terminal FP, thus the breakage of the first switching control element 53 can be prevented. The transient voltage Vt is attenuated over time.

As described above, in the normal term T1, the first switching control element 53 repeats the ON/OFF operation at the duty ratio corresponding to the duty ratio designation signal Sd, and in the case in which the rotary electric machine 20 is driven as an electric motor, the drive force is controlled in accordance with the duty ratio, or in the case in which the rotary electric machine 20 is driven as a generator, the generated voltage of the armature coil 21 is controlled to be the voltage value corresponding to the duty ratio designation signal Sd by the ON/OFF operation of the first switching control element 53.

Then, an operation in the abnormal term T2 shown in FIG. 2 will be explained. The field control circuit 70 detects occurrence of the first type malfunction based on the field voltage information Vin and the field current information Iin. Specifically, the field control circuit 70 detects the first type malfunction when the field voltage information Vin becomes equal to or higher than the battery voltage Vb of the in-vehicle battery 10 while setting the first control voltage FH to be the off-level signal OFF, or when the field current information Iin becomes equal to or larger than the field current value Id corresponding to the duty ratio designation signal Sd while setting the first control voltage FH to be the off-level signal OFF.

FIG. 2 exemplifies the case in which the field control circuit 70 detects the first type malfunction with the timing t1 with which the first control signal FH becomes the off-level signal OFF. At the timing t1, the transition from the normal term T1 to the abnormal term T2 occurs. When detecting the first type malfunction with the timing t1, the field control circuit 70 notifies the host engine control unit with the detection of the malfunction using the output signal Sout, and at the same time, starts a protection operation for the field drive circuit 50. In the protection operation, the field control circuit 70 performs the protection operation for the field drive circuit 50 by a series of first, second, and third operations. In the first operation, the first control signal FH is switched to the on-level signal ON with the timing t1 while the second control signal FS is kept to be the on-level signal ON. In the second operation, the second control signal FS is switched to the off-level signal OFF with the timing t2, which is a predetermined time ta delayed from the timing t1, while the first control signal FH is kept to be the on-level signal ON. In the third operation, the first control signal FH is switched to the off-level signal OFF with the timing t3, which is a predetermined time tb further delayed from the timing t2, while the second control signal FS is kept to be the off-level signal OFF.

In the first operation with the timing t1, when the short-circuit malfunction is caused in the first switching control element 53, the first switching control element 53, which is in the short-circuit malfunction state, is not changed in the state even if the first control signal FH is switched to the on-level signal ON, and the state in which the field current is supplied to the field coil 23 via the first switching control element 53 is continued. When no short-circuit malfunction is caused in the first switching control element 53, but the short-to-power malfunction is caused in the positive field terminal FP, the first switching control element 53 is turned on by the first operation with the timing t1.

Since in the second operation with the timing t2, the second control signal FS is switched to the off-level signal OFF, the second switching control element 58 is turned off, thus the field current flowing through the field coil 23 is blocked. The blocking of the field current causes the transient voltage Vt with a polarity directed from the positive field terminal FP to the negative field terminal FN in the field coil 23. However, since the first switching control element 53 is turned on by the first operation with the timing t1 prior to the timing t2 or is in the short-circuit state, the circulating field current flows through a loop circuit in accordance with the transient voltage Vt, the loop circuit starting from the positive field terminal FP and returning to the positive field terminal FP via the field coil 23, the negative field terminal FN, the second diode element 57, and the first switching control element 53, thus the transient voltage Vt can be prevented from concentrating into the second switching control element 58, thereby preventing the breakage of the second switching control element 58. The transient voltage Vt is attenuated over time.

In the third operation with the timing t3, the first control signal FH is switched to the off-level signal OFF, and the first switching control element 53 is turned off. At timing t3, the predetermined time delay tb has passed since the timing t2, and the circulating field current flowing through the first switching control element 53 is attenuated with the time delay tb, and consequently, even if the first switching control element 53 is turned off, there is no chance of causing the large transient voltage.

As described above, in the automotive rotary electrical apparatus 100 according to the first embodiment, the two switching control elements 53, 58, and the two diode elements 54, 57 are used for the field drive circuit 50, and is capable of blocking the field current while preventing the breakage of the second switching control element 58 when the first type malfunction is caused in the feeder circuit 51 for the field coil 23.

Then, an operation in the abnormal term T3 shown in FIG. 3 will be explained. The field control circuit 70 detects occurrence of the second type malfunction based on the field current information Iin. Specifically, the field control circuit 70 detects the second type malfunction when, for example, the field current information Iin becomes equal to or lower than the field current value Id corresponding to the duty ratio designation signal Sd while setting the first control signal FH to be the off-level signal OFF.

FIG. 3 exemplifies the case in which the field control circuit 70 detects the second type malfunction with the timing t4 with which the first control signal FH becomes the off-level signal OFF. At the timing t4, the transition from the normal term T1 to the abnormal term T3 occurs. When detecting the second type malfunction with the timing t4, the field control circuit 70 notifies the host engine control unit with the detection of the malfunction using the output signal Sout, and at the same time, starts a protection operation for the field drive circuit 50. In the protection operation, the field control circuit 70 keeps the first control signal FH in the off-level signal OFF throughout the abnormal term T3 on and after the timing t4. The second control signal FS is switched to the off-level signal OFF with the timing t5 at which a predetermined delay time (ta+tb) has passed since the timing t4. Although the negative field terminal FN or the wiring connected thereto has direct contact with the common potential point G in the second type malfunction, and consequently, the current hardly flows through the second switching control element 58, by turning off the second switching control element 58 with the timing t5 at which the predetermined delay time (ta+tb) has passed since the timing t4 at which the malfunction has been detected keeping on the safe side, the breakage of the second switching control element 58 is prevented.

It should be noted that although there is a possibility of breaking the first switching control element 53 by turning off the second switching control element 58 with the first control signal FH switched to the on-level signal ON and then turning off the first switching control element 53 in the abnormal term T3 in which the second type malfunction has been detected similarly to the abnormal term T2 in which the first type malfunction has been detected, by controlling it as shown in FIG. 3, the possibility of breaking the first switching control element 53 is also eliminated.

Second Embodiment

Figure 4:
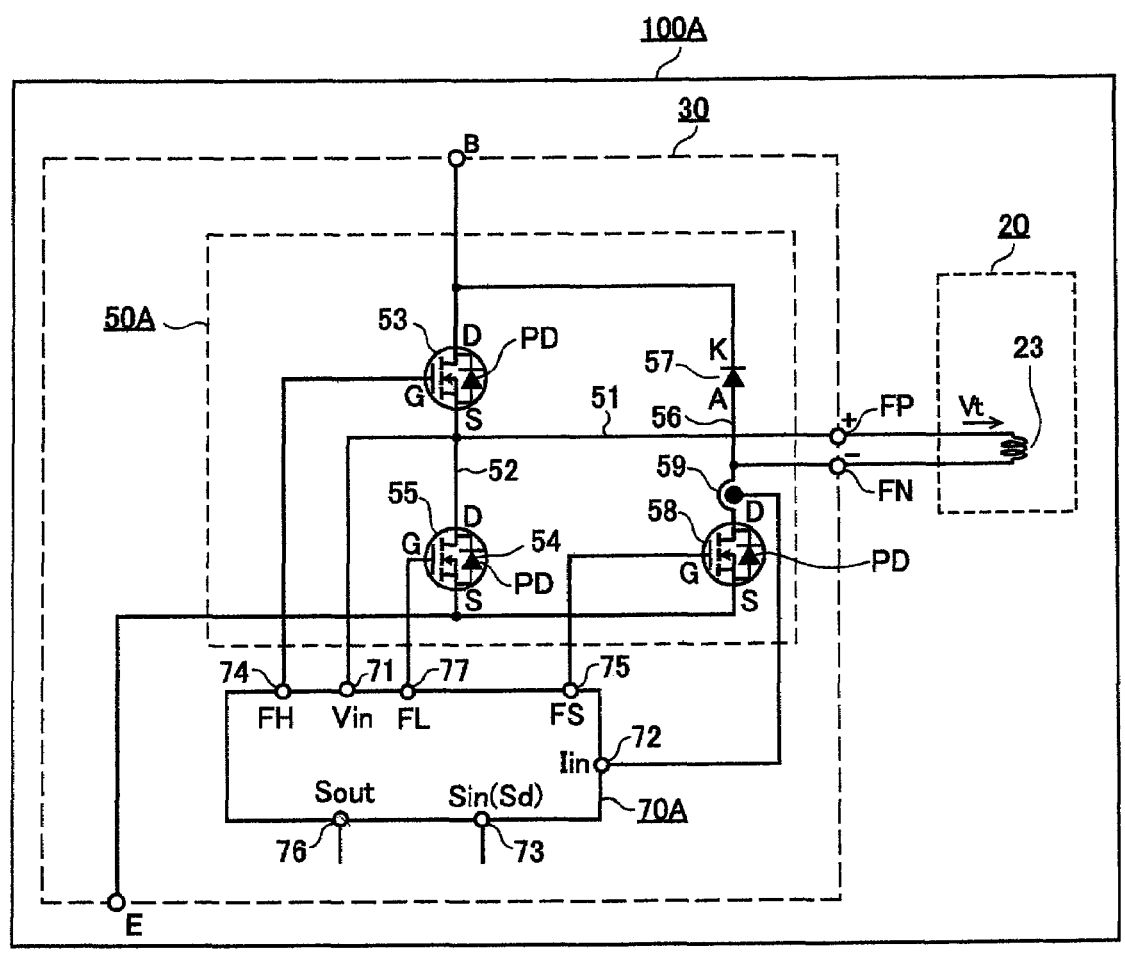
FIG. 4 is an electric diagram showing a second embodiment of the automotive rotary electrical apparatus according to the present invention.

FIG. 4 is an electric diagram showing a second embodiment of the automotive rotary electrical apparatus according to the present invention. In the automotive rotary electrical apparatus 100A according to the second embodiment, the field drive circuit 50 in the first embodiment shown in FIG. 1 is replaced with a field drive circuit 50A, and further, the field control circuit 70 in the first embodiment is replaced with a field control circuit 70A. Other sections of the configuration are the same as those in the first embodiment. It should be noted that although in FIG. 4 only the field coil 23 is shown as the rotary electric machine 20, and the power conversion circuit 40 is omitted in the control device 30, the rotary electric machine 20 and the power conversion circuit 40 are configured to be the same as those of the first embodiment.

In the field drive circuit 50A of the second embodiment, the first diode element 54 in the first embodiment is replaced with a third switching control element 55. Other sections of the configuration are the same as those of the field drive circuit 50 in the first embodiment. The third switching control element 55 is also formed, for example, of an N-channel power MOSFET, and has a drain D, a source S, and a gate G. The third switching control element 55 is connected between the positive field terminal FP and the common potential terminal E of the control device 30, wherein the drain D thereof is directly connected to both the source S of the first switching control element 53 and the positive field terminal FP, and the source S thereof is directly connected to both the source S of the second switching control element 58 and the common potential terminal E. The semiconductor chip forming the third switching control element 55 has a protective diode element PD integrally built therein, and the protective diode element PD functions as the first diode element 54.

The field control circuit 70A in the second embodiment is configured with a microcomputer similarly to the field control circuit 70 in the first embodiment, and further has an output terminal 77 in addition to the field control circuit 70 in the first embodiment. Other sections of the configuration are the same as those of the field control circuit 70 in the first embodiment. A third control signal FL is generated on the output terminal 77, and is supplied to the gate G of the third switching control element 55 therefrom.

Figure 5:
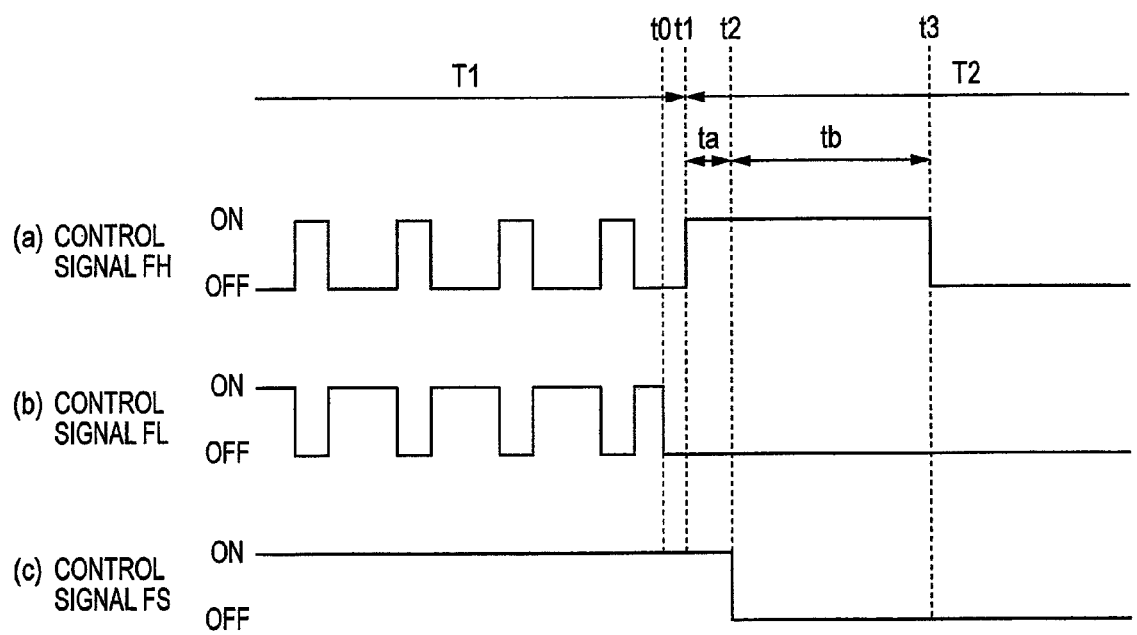
FIG. 5 is a signal waveform diagram showing a variation in a control signal in the case in which the first type malfunction is caused in the second embodiment.

FIG. 5 shows variations in the first, second, and third control signals FH, FS, FL in the case in which the first type malfunction occurs in the feeder circuit 51 in the second embodiment. In FIG. 5, a waveform (a) shows the first control signal FH, a waveform (b) shows the third control signal FL, and a waveform (c) shows the second control signal FS. The horizontal axis of FIG. 5 is a time axis common to the first, second, and third control signals FH, FS, FL. A term T1 represents a normal term in which the feeder circuit 51 for the field coil 23 is normal, and a term T2 represents an abnormal term in which the first type malfunction is caused in the feeder circuit 51. In the normal term T1, the third control signal FL is formed as an inverted signal of the first control signal FH.

In the normal term T1, the first control signal FH repeats alternating between the on-level signal ON and the off-level signal OFF at a duty ratio corresponding to the duty ratio designation signal Sd based on the duty ratio designation signal Sd, thus performing the duty control of the field coil 23. In the normal term T1, the third control signal FL is formed as an inverted signal of the first control signal FH, and the third switching control element 55 is turned on when the first switching control element 53 is turned off. Therefore, when the first switching control element 53 is turned off, the circulating field current flows through a loop circuit based on the transient voltage Vt caused in the field coil 23, the loop circuit starting from the positive field terminal FP and returning to the positive field terminal FP via the field coil 23, the negative field terminal FN, the field current sensor 59, the second switching control element 58, and the third switching control element 55, thus the transient voltage Vt is prevented from being concentrated into the first switching control element 53 by the circulating current, and the breakage of the first switching control element 53 is also prevented.

In an on-state of the third switching control element 55, the on-resistance thereof is as low as, for example, 20 mΩ or lower, thus the loss in the third switching control element 55 can sufficiently be reduced compared to the case with the first diode element 54 with the forward voltage of about 0.8 volt. Therefore, in the second embodiment, the loss based on the transient voltage Vt caused when the first switching control element 53 is turned off can be reduced in the normal term T1 compared to the first embodiment.

FIG. 5 exemplifies the case in which the field control circuit 70 detects the first type malfunction with the timing t0. At the timing t0, the transition from the normal term T1 to the abnormal term T2 occurs. The timings t1, t2, and t3 in FIG. 5 are the same as in FIG. 2, and in FIG. 5, the first type malfunction is detected by the field control circuit 70A with the timing t0 prior to the timing t1, and the abnormal term T2 is started with the timing t0. As shown in FIG. 5, the timing t0 precedes the protective operation at the timings t1, t2, and t3, and prior to the operation of switching the first control signal FH to the on-level signal ON with the timing t1, the third control signal FL is switched to the off-level signal OFF with the timing t0, thus the third switching control element 55 is turned off. At the timing t0, the first control signal FH remains as the off-level signal OFF, and the second control signal FS remains as the on-level signal ON. By turning off the third switching control element 55 prior to the first switching control element 53, it can surely be prevented that the first and third switching control elements 53, 55 are simultaneously turned on to cause the short-circuit current to flow through the first and third switching control elements 53, 55.

As described above, in the second embodiment, the same advantage as in the first embodiment can be obtained, and in addition, it becomes possible to reduce the loss based on the transient voltage Vt caused in the field coil 23 when the first switching control element 53 is turned off in the normal term T1. Further, when the first type malfunction occurs, by switching the third control signal FL to the off-level signal OFF prior to the first control signal FH being switched to the on-level signal ON, it can surely be prevented that the first and third switching control elements 53, 55 are simultaneously turned on.

It should be noted that in the second embodiment, the protective operation in response to occurrence of the second type malfunction is performed as shown in FIG. 3 similarly to the case with the first embodiment.

Third Embodiment

Figure 6:
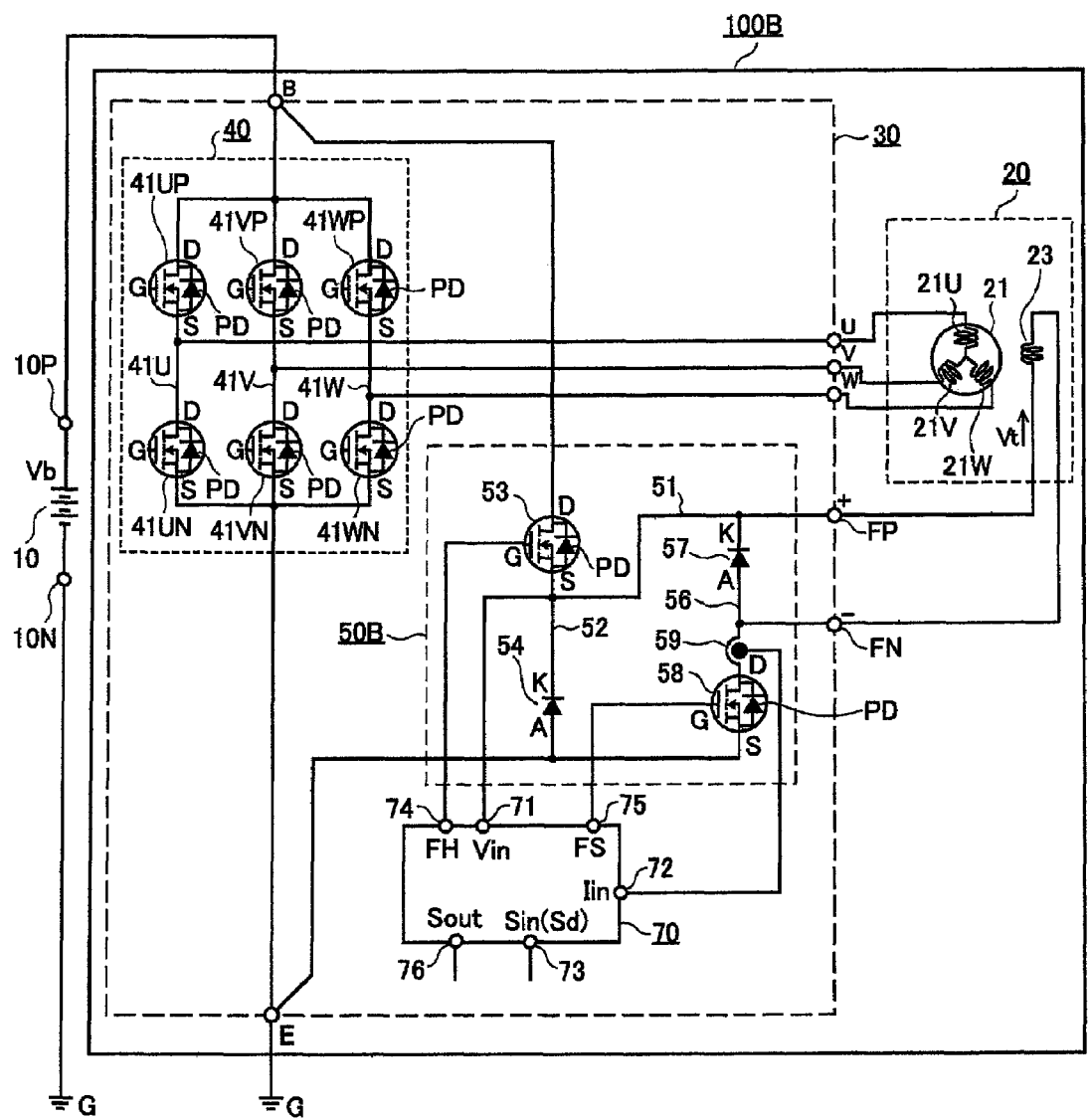
FIG. 6 is an electric diagram showing a third embodiment of the automotive rotary electrical apparatus according to the present invention.

FIG. 6 is an electric diagram showing a third embodiment of the automotive rotary electrical apparatus according to the present invention. In the automotive rotary electrical apparatus 100B in the third embodiment, the field drive circuit 50 in the first embodiment shown in FIG. 1 is replaced with a field drive circuit 50B. Other sections of the configuration are the same as those in the first embodiment.

The field drive circuit 50B of the third embodiment is configured so that the second cable 56 becomes parallel to the first diode element 54, and the second diode element 57 is connected between the positive field terminal FP and the negative field terminal FN in parallel to the field coil 23. The anode A of the second diode element 57 is directly connected to the negative field terminal FN, and the cathode K thereof is directly connected to the positive field terminal FP. Other sections of the configuration are the same as those of the field drive circuit 50 in the first embodiment.

Figure 7:
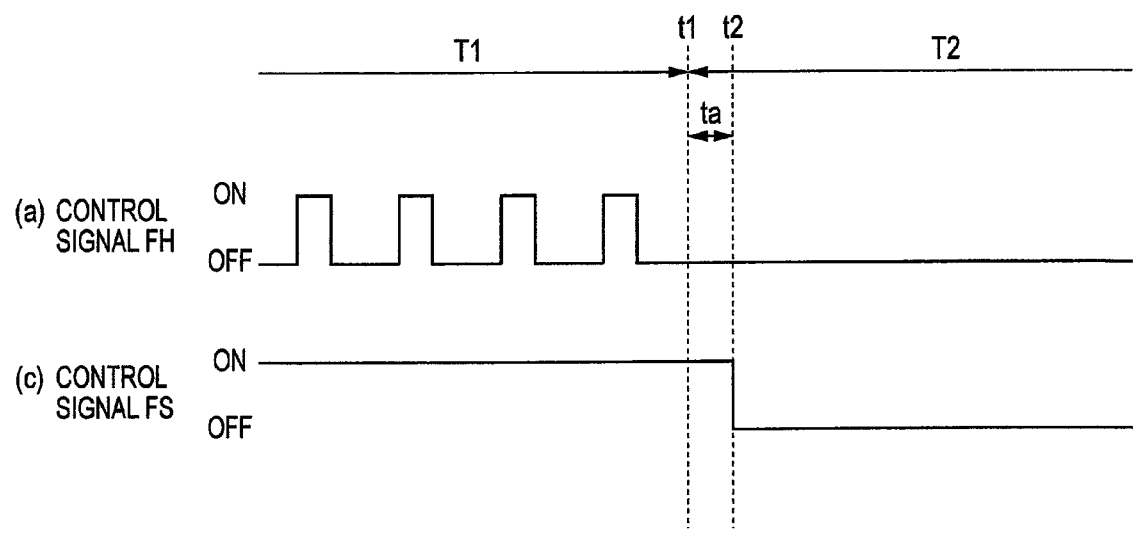
FIG. 7 is a signal waveform diagram showing a variation in a control signal in the case in which the first type malfunction is caused in the third embodiment.

FIG. 7 shows variations in the first and second control signals FH, FS in the case in which the first type malfunction, namely either the short-to-power malfunction in the positive field terminal FP or the short-circuit malfunction in the first switching control element 53, occurs in the feeder circuit 51 for the field coil 23 in the third embodiment. In FIG. 7, a waveform (a) shows the first control signal FH, and a waveform (b) shows the second control signal FS. The horizontal axis of FIG. 7 is a time axis common to the first and second control signals FH, FS. A term T1 represents a normal term in which the feeder circuit 51 for the field coil 23 is normal, and a term T2 represents an abnormal term in which the first type malfunction is caused in the feeder circuit 51.

In the normal term T1, as shown in FIG. 7, by the first control signal FH repeating alternating between the on-level signal ON and the off-level signal OFF based on the duty ratio designation signal Sd while the second control signal FS remains as the on-level signal ON, the duty control of the field coil 23 is performed. The operation of the field drive circuit 50B in the normal term T1 is the same as the operation of the field drive circuit 50 in the normal term T1 in the first embodiment.

FIG. 7 exemplifies the case in which the field control circuit 70 detects that the first type malfunction occurs in the feeder circuit 51 for the field coil 23 with the timing t1 with which the first control signal FH becomes the off-level signal OFF. Although the transition from the normal term T1 to the abnormal term T2 occurs with the timing t1, since the second diode element 57 is connected between the positive field terminal FH and the negative field terminal FN in the third embodiment, the first control signal FH is controlled to remain as the off-level OFF in the abnormal term T2 after the timing t1. In the abnormal term T2, the second control signal FS is switched to the off-level signal OFF with the timing t2 a predetermined delay time ta after the timing t1 while the first control signal FH remains as the off-level signal OFF. By turning off the second switching control element 58 with the timing t2, the field current flowing through the field coil 23 is blocked.

In the third embodiment, although the transient voltage Vt is caused in the field coil 23 with the timing t2 in response to turning off the second switching control element 58, the circulating field current in accordance with the transient voltage Vt flows through the loop circuit passing through the second diode element 57, thus the transient voltage Vt can be prevented from being concentrated into the second switching control element 58, and consequently the breakage of the second switching control element 58 can be prevented.

In the first embodiment, in order for allowing the field circulating current responsive to the transient voltage Vt caused in the field coil 23 to flow through the second diode element 57 and the first switching control element 53 when the second switching control element 58 is turned off with the timing t2 in the abnormal term T2, the first control signal FH is switched to the on-level signal ON with the timing t1. However, in the third embodiment, since the second diode element 57 is connected between the positive field terminal FP and the negative field terminal FN, the circulating field current responsive to the transient voltage Vt is allowed to flow through the second diode element 57 when the second switching control element 58 is turned off with the timing t2. Therefore, the first control signal FH is not switched to the on-level signal ON with the timing t1.

As described above, in the automotive rotary electrical apparatus 100B according to the third embodiment, the two switching control elements 53, 58, and the two diode elements 54, 57 are used for the field drive circuit 50B similarly to the first embodiment, and is capable of blocking the field current while preventing the breakage of the second switching control element 58 when the first type malfunction is caused in the feeder circuit 51 for the field coil 23.

It should be noted that in the third embodiment, the protective operation in response to occurrence of the second type malfunction is performed as shown in FIG. 3 similarly to the case with the first embodiment.

Fourth Embodiment

Figure 8:
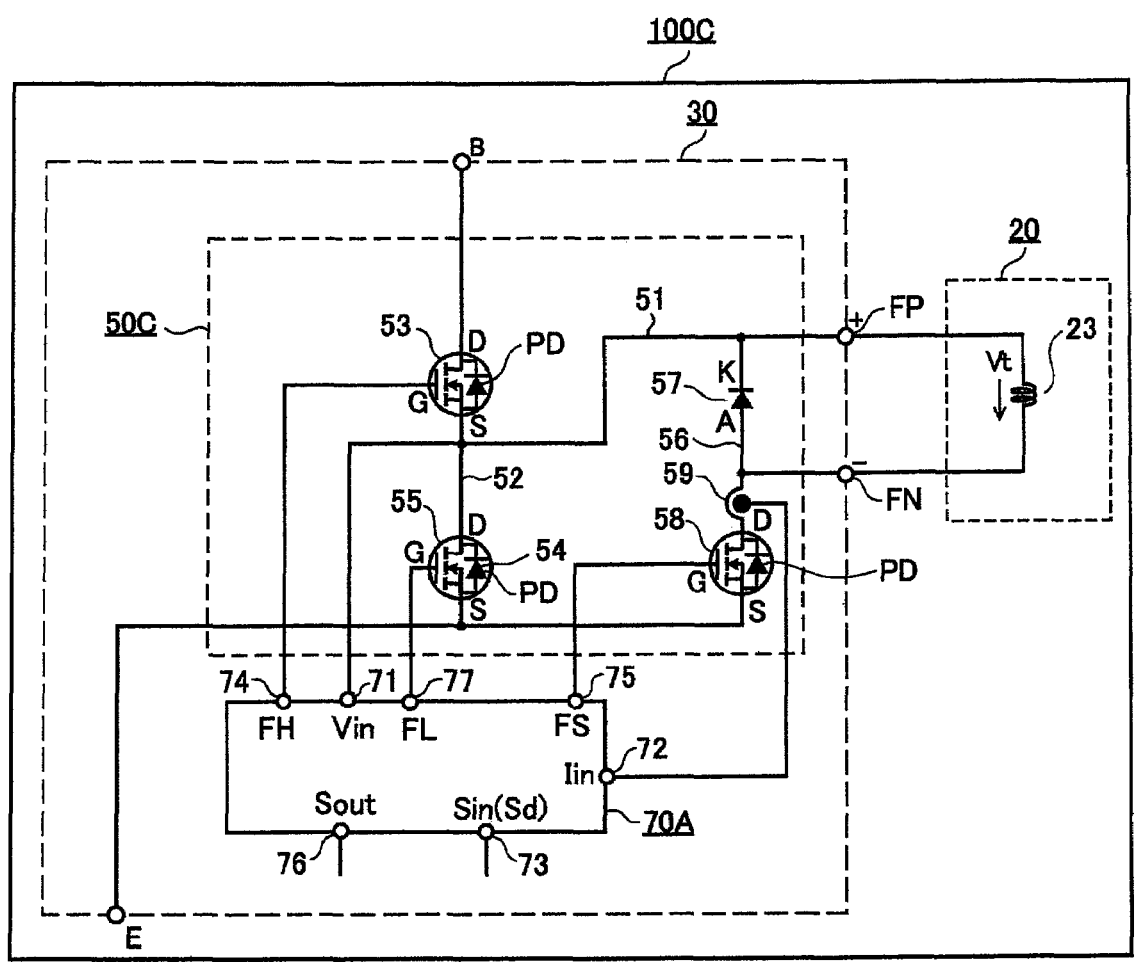
FIG. 8 is an electric diagram showing a fourth embodiment of the automotive rotary electrical apparatus according to the present invention.

FIG. 8 is an electric diagram showing a fourth embodiment of the automotive rotary electrical apparatus according to the present invention. In the automotive rotary electrical apparatus 100C according to the fourth embodiment, the field drive circuit 50B in the third embodiment shown in FIG. 6 is replaced with a field drive circuit 50C, and further, the field control circuit 70 in the third embodiment is replaced with a field control circuit 70A. Other sections of the configuration are the same as those in the third embodiment. It should be noted that although in FIG. 8 only the field coil 23 is shown as the rotary electric machine 20, and the power conversion circuit 40 is omitted in the control device 30, the rotary electric machine 20 and the power conversion circuit 40 are configured to be the same as those of the third embodiment.

In the field drive circuit 50C of the fourth embodiment, the first diode element 54 in the third embodiment is replaced with a third switching control element 55. Other sections of the configuration are the same as those of the field drive circuit 50B in the third embodiment.

The field control circuit 70A in the fourth embodiment is configured identically to the field control circuit 70A in the second embodiment.

Figure 9:
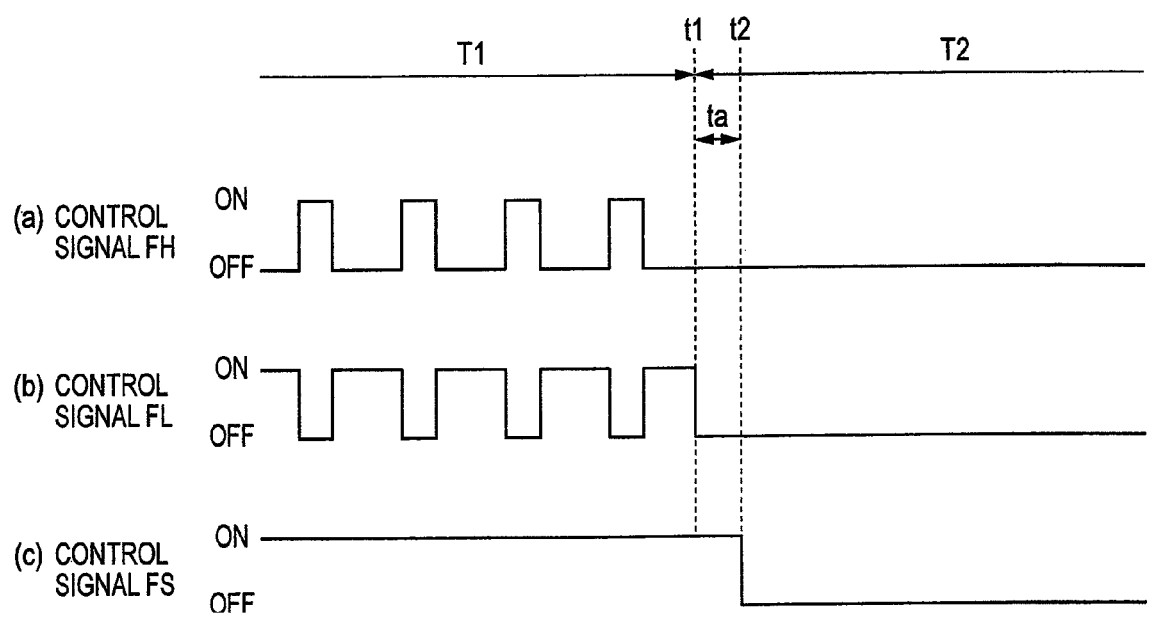
FIG. 9 is a signal waveform diagram showing a variation in a control signal in the case in which the first type malfunction is caused in the fourth embodiment.

FIG. 9 shows variations in the first, second, and third control signals FH, FS, FL in the case in which the first type malfunction, namely either the short-to-power malfunction in the positive field terminal FP or the short-circuit malfunction in the first switching control element 53, occurs in the feeder circuit 51 for the field coil 23 in the fourth embodiment. In FIG. 9, a waveform (a) shows the first control signal FH, a waveform (b) shows the third control signal FL, and a waveform (c) shows the second control signal FS. The horizontal axis of FIG. 9 is a time axis common to the first, second, and third control signals FH, FS, FL. A term T1 represents a normal term in which the feeder circuit 51 for the field coil 23 is normal, and a term T2 represents an abnormal term in which the first type malfunction is caused in the feeder circuit 51. In the normal term T1, the third control signal FL is formed as an inverted signal of the first control signal FH.

Similarly to the second embodiment, the third control signal FL is formed as an inverted signal of the first control signal FH in the normal term T1, and the third switching control element 55 repeats alternating between the on-level signal ON and the off-level signal OFF at a duty ratio corresponding to the duty ratio designation signal Sd in accordance with the duty ratio designation signal Sd so as to have a reversed state from the first switching control element 53. The third switching control element 55 is turned on when the first switching control element 53 is turned off, and forms a loop circuit with a low resistance for the transient voltage Vt, thus reducing the loss caused by the transient voltage Vt.

Further, in the fourth embodiment, it is possible to eliminate a detection error of the field current detected by the field current sensor 59 in the normal term T1, thus detecting the field current more accurately. Since the third switching control element 55 is not used in the third embodiment, when the first switching control element 53 is turned off in the normal term T1, the circulating field current flows through a circuit including the field current sensor 59, the second switching control element 58, and the first diode element 54 in accordance with the transient voltage Vt caused in the field coil 23, and at the same time, the circulating field current is divided to flow through a circuit including the second diode element 57. Although the field current flowing through the field coil 23 wholly flows through the field current sensor 59 in the state in which the first switching control element 53 is turned on, when the first switching control element 53 is turned off, the circulating field current does not pass through the field current sensor 59, resulting in the divided current flowing through the second diode element 57. Therefore, the error is caused in the field current detected by the field current sensor 59. In the fourth embodiment, since the third switching control element 55 is turned on when the first switching control element 53 is turned off, and the on-resistance of the third switching control element 55 is low enough in comparison with the forward voltage of the second diode element 57, the circulating field current responsive to the transient voltage Vt wholly flows into a circuit including the field current sensor 59, the second switching control element 58, and the third switching control element 55, as a result, thus no error is caused in the field current detected by the field current sensor 59.

FIG. 9 exemplifies the case in which the field control circuit 70 detects the first type malfunction with the timing t1 when the first control signal FH is the OFF-level signal OFF. At the timing t1, the transition from the normal term T1 to the abnormal term T2 occurs. The first control signal FH is controlled so as to remain as the off-level signal OFF on and after the timing t1 in the abnormal term T2. The third control signal FL is switched to the off-level signal OFF with the timing t1, and thereafter remains as the off-level signal OFF. The second control signal FS is switched to the off-level signal OFF with the timing t2 the predetermined delay time ta after the timing t1, and the second switching control element 58 is turned off with the timing t2 to block the field current flowing through the field coil 23.

In the fourth embodiment, the same advantage as in the third embodiment can be obtained, and in addition, when the first switching control element 53 is turned off in the normal term T1, there is obtained an advantage that the circulating field current flowing through the field coil 23 in accordance with the transient voltage Vt caused in the field coil 23 is allowed to flow through the third switching control element 55, thus improving the error in the field current detected by the field current sensor 59.

It should be noted that in the fourth embodiment, the protective operation responsive to occurrence of the second type malfunction is performed as shown in FIG. 3 similarly to the case with the first embodiment.

Fifth Embodiment

Figure 10:
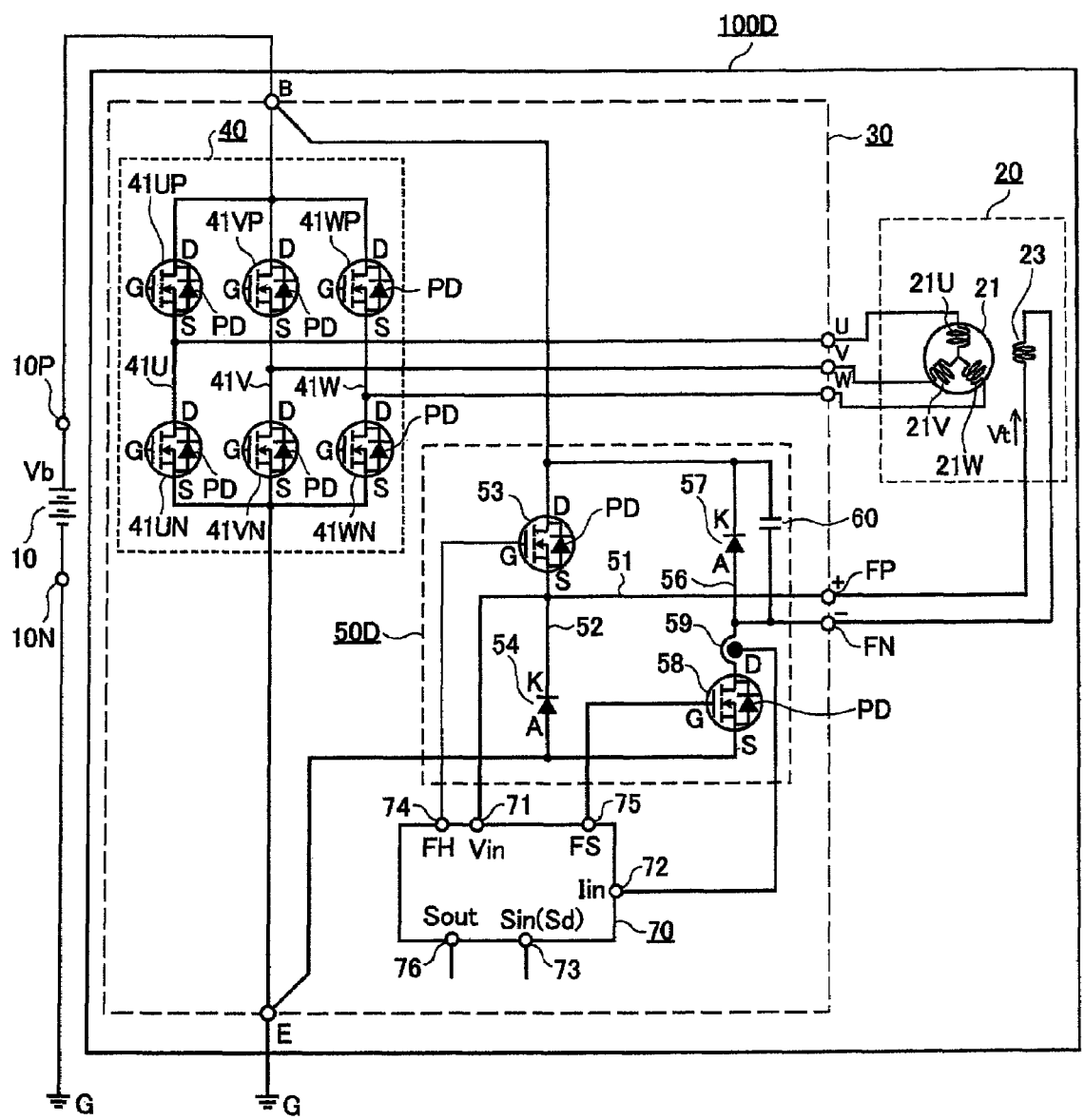
FIG. 10 is an electric diagram showing a fifth embodiment of the automotive rotary electrical apparatus according to the present invention.

FIG. 10 is an electric diagram showing a fifth embodiment of the automotive rotary electrical apparatus according to the present invention. The automotive rotary electrical apparatus 100D in the fifth embodiment has a field drive circuit 50D as a replacement of the field drive circuit 50 in the first embodiment shown in FIG. 1. Other sections of the configuration are the same as those in the first embodiment.

The field drive circuit 50D in the fifth embodiment has a capacitor 60 in addition to the field drive circuit 50 in the first embodiment. Other sections of the configuration are the same as those of the field drive circuit 50. As shown in FIG. 10, the capacitor 60 is connected in parallel to the second diode element 57. One end of the capacitor 60 is directly connected to the battery terminal B of the control device 100D, and the other end thereof is directly connected to the negative field terminal FN of the control device 100D.

When the first switching control element 53 is turned on, a rapid change in current is caused in the field coil 23. Although this rapid change in current is supplied from the positive terminal 10P of the in-vehicle battery 10 to the battery terminal B of the control device 100D in the case in which the capacitor 60 is not connected thereto, the in-vehicle battery 10 has a high alternating-current impedance, and consequently, the voltage of the battery terminal B instantaneously drops in response to the rapid change in current described above. The capacitor 60 releases the charge accumulated therein in response to the rapid change in current described above, thus preventing the voltage of the battery terminal B from dropping.

Since the field current which has been supplied from the battery terminal B to the field coil 23 is blocked when the first switching control element 53 is turned off, the transient voltage is caused so as to continue the flow of the field current due to the inductance component of the wiring connecting the positive terminal 10P of the in-vehicle battery 10 and the battery terminal B, and the voltage of the battery terminal B is instantaneously raised by the transient voltage. The capacitor 60 accumulates the charge caused by the transient voltage, thereby preventing the voltage of the battery terminal B from rising.

As described above, in the fifth embodiment, by adding the capacitor 60, the voltage variation of the battery terminal B caused by turning on or off of the first switching control element 53 is suppressed to stabilize the voltage of the battery terminal B, thereby making it possible to stabilize the operation of the field drive circuit 50D.

Further, in the fifth embodiment, a protective operation can be performed by the field control circuit 70 even in the case in which a short-circuit malfunction is caused in the capacitor 60. Since the capacitor 60 is connected between the battery terminal B and the negative field terminal FN, and the second control signal FS always remains as the on-level signal ON to keep the second switching control element 58 always-on in the normal term T1, when the short-circuit malfunction is caused in the capacitor 60, a short-circuit current flows through the capacitor 60 and the second switching control element 58, and the short-circuit current flows through the field current sensor 59. Therefore, the short-circuit malfunction in the capacitor 60 can be detected based on the field current information Iin input to the field control circuit 70.

The field control circuit 70 performs the protective operation for the field drive circuit 50D when detecting the short-circuit malfunction in the capacitor 60. The protective operation is the same as the protective operation in the abnormal term T2 shown in FIG. 7. Assuming that the short-circuit malfunction of the capacitor 60 is detected with the timing t1, the first control signal FH is kept as the off-level signal OFF on and after the timing t1. The second control signal FS is switched to the off-level signal OFF with the timing t2 thereafter while keeping the first control signal FH as the off-level signal OFF. Since the short-circuit current of the capacitor 60 does not flow through the field coil 23, the short-circuit current of the capacitor 60 can be blocked by the protective operation without breaking the second switching control element 58.

As described above, in the fifth embodiment, the same advantage as in the first embodiment can be obtained, and in addition, it is possible to stabilize the voltage of the battery terminal B to stabilize the operation of the field drive circuit 50D because the capacitor 60 prevents the voltage variation in the battery terminal B caused by turning on or off of the first switching control element 53, and further, the short-circuit current of the capacitor 60 can be blocked without breaking the second switching control element 58 even in the case in which the short-circuit malfunction is caused in the capacitor 60.

Sixth Embodiment

Figure 11:
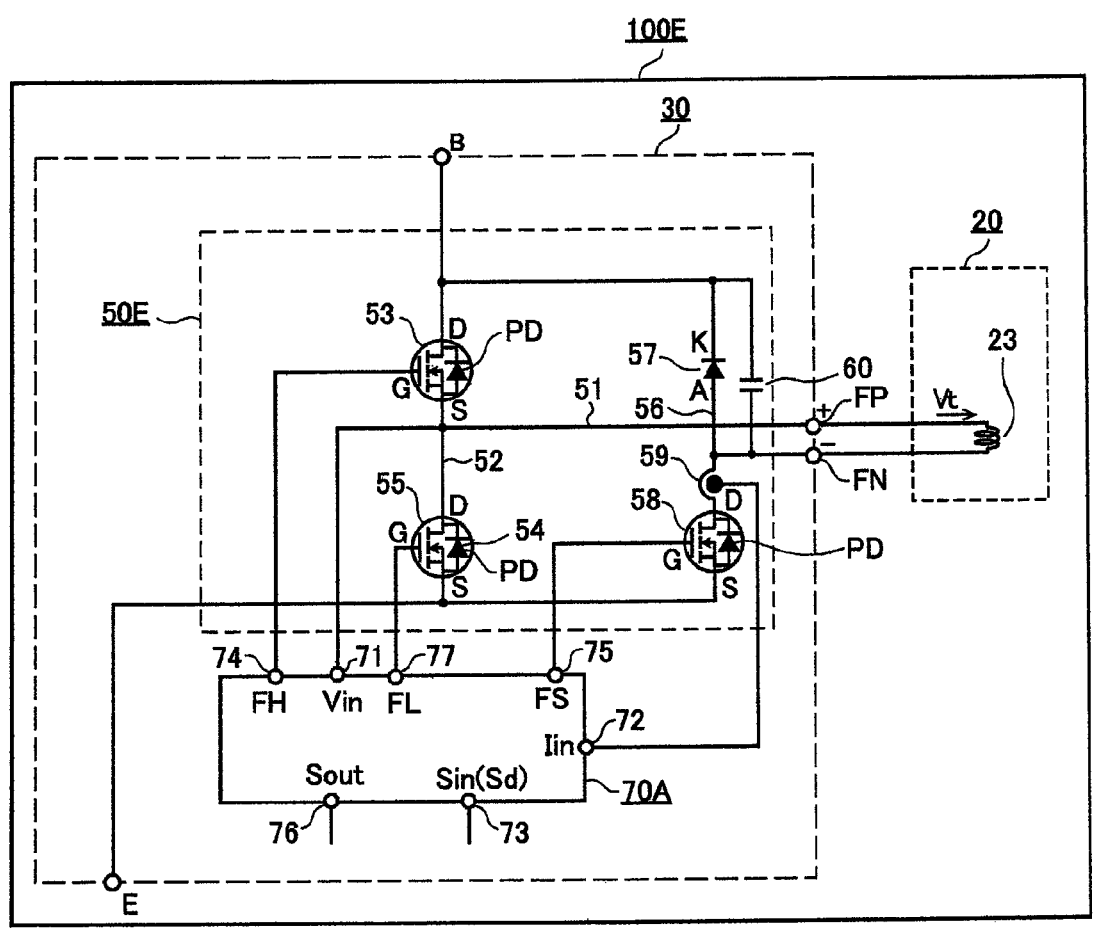
FIG. 11 is an electric diagram showing a sixth embodiment of the automotive rotary electrical apparatus according to the present invention.

FIG. 11 is an electric diagram showing a sixth embodiment of the automotive rotary electrical apparatus according to the present invention. In the automotive rotary electrical apparatus 100E in the sixth embodiment, the field drive circuit 50A in the second embodiment shown in FIG. 4 is replaced with a field drive circuit 50E. Other sections of the configuration are the same as those in the second embodiment.

The field drive circuit 50E in the sixth embodiment has a capacitor 60 in addition to the field drive circuit 50A in the second embodiment. Other sections of the configuration are the same as those of the field drive circuit 50A in the second embodiment. Similarly to the capacitor 60 in the fifth embodiment, the capacitor 60 is connected in parallel to the second diode element 57, and one end thereof is directly connected to the battery terminal B while the other end thereof is directly connected to the negative field terminal FN.

Similarly to the capacitor 60 in the fifth embodiment, the capacitor 60 prevents the voltage variation of the battery terminal B caused by turning on or off of the first switching control element 53 to stabilize the voltage of the battery terminal B, thereby stabilizing the operation of the field drive circuit 50E.

Further, similarly to the fifth embodiment, also in the sixth embodiment, the protective operation can be performed by the field control circuit 70A in the case in which the short-circuit malfunction is caused in the capacitor 60. When the short-circuit malfunction is caused in the capacitor 60, the short-circuit current flows through the capacitor 60 and the second switching control element 58, and the short-circuit current further flows through the field current sensor 59, and consequently, the short-circuit malfunction of the capacitor 60 can be detected based on the field current information Iin input to the field control circuit 70A.

The field control circuit 70A performs the protective operation for the field drive circuit 50E when detecting the short-circuit malfunction in the capacitor 60. The protective operation is the same as the protective operation in the abnormal term T2 shown in FIG. 9. Assuming that the short-circuit malfunction of the capacitor 60 is detected with the timing t1, the first control signal FH is kept as the off-level signal OFF on and after the timing t1, and further, the third control signal FL is switched to the off-level signal OFF with the timing t1, and kept as the off-level signal OFF on and after the timing t1. Then, the second control signal FS is switched to the off-level signal OFF with the timing t2 thereafter while keeping the first and third control signals FH, FL as the off-level signals OFF. Since the short-circuit current of the capacitor 60 does not flow through the field coil 23, the short-circuit current of the capacitor 60 can be blocked by the protective operation without breaking the second switching control element 58.

In the sixth embodiment, the same advantage as in the second embodiment can be obtained, and in addition, it is possible to stabilize the voltage of the battery terminal B to stabilize the operation of the field drive circuit 50E because the capacitor 60 suppresses the voltage variation in the battery terminal B caused by turning on or off of the first switching control element 53, and further, the short-circuit current of the capacitor 60 can be blocked without breaking the second switching control element 58 even in the case in which the short-circuit malfunction is caused in the capacitor 60.

Seventh Embodiment

Figure 12:
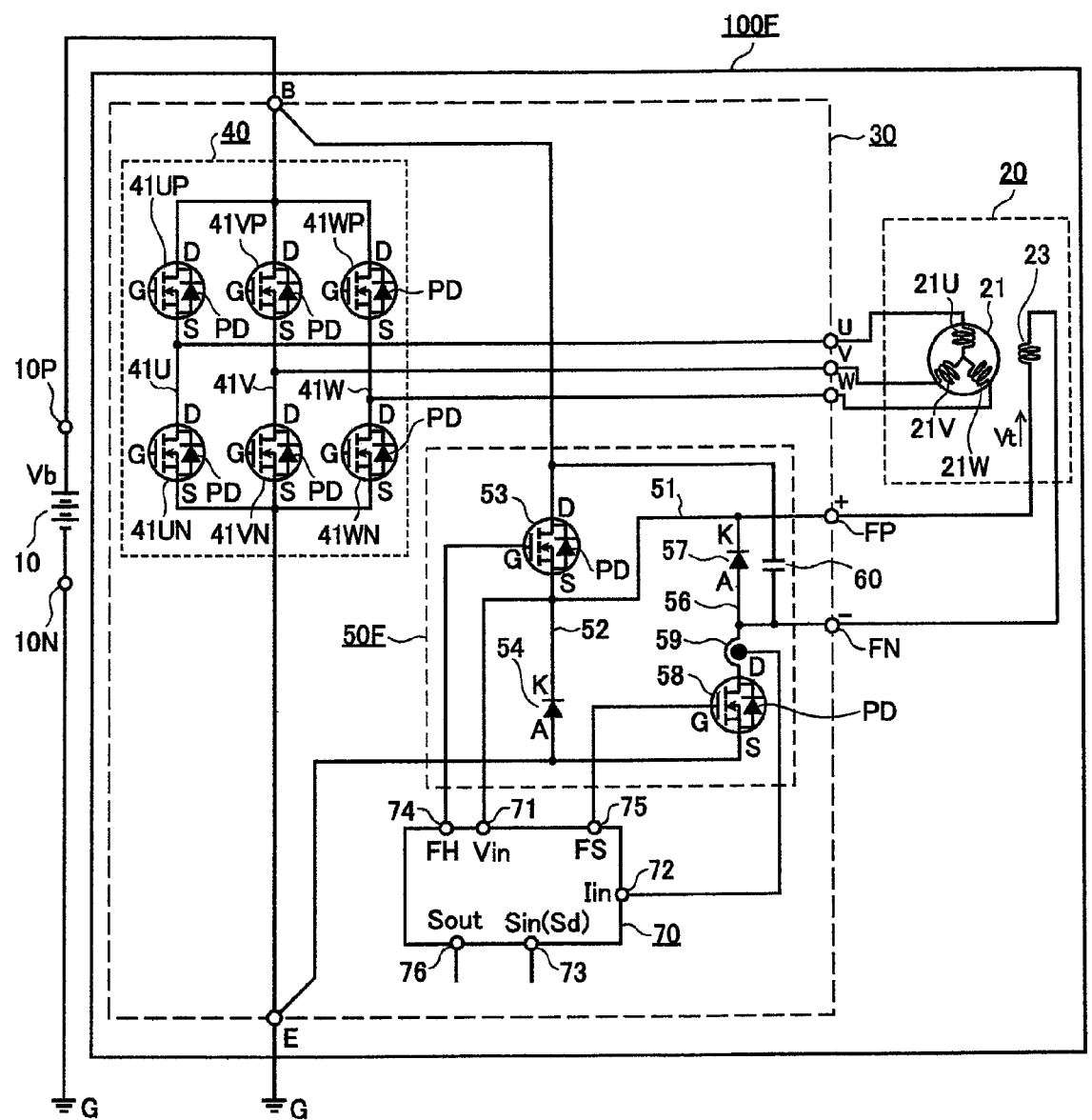
FIG. 12 is an electric diagram showing a seventh embodiment of the automotive rotary electrical apparatus according to the present invention.

FIG. 12 is an electric diagram showing a seventh embodiment of the automotive rotary electrical apparatus according to the present invention. In the automotive rotary electrical apparatus 100F in the seventh embodiment, the field drive circuit 50B in the third embodiment shown in FIG. 6 is replaced with a field drive circuit 50F. Other sections of the configuration are the same as those in the third embodiment.

The field drive circuit 50F in the seventh embodiment has a capacitor 60 in addition to the field drive circuit 50B in the third embodiment. Other sections of the configuration are the same as those of the field drive circuit 50B in the third embodiment. The capacitor 60 of the seventh embodiment is connected between the battery terminal B and the negative field terminal FN, and one end thereof is connected to the drain D of the first switching control element 53 while the other end thereof is connected to the anode A of the second diode element 57.

Similarly to the capacitor 60 in the fifth embodiment, the capacitor 60 suppresses the voltage variation of the battery terminal B caused by turning on or off of the first switching control element 53 to stabilize the voltage of the battery terminal B, thereby stabilizing the operation of the field drive circuit 50F.

Further, similarly to the fifth embodiment, also in the seventh embodiment, the protective operation can be performed by the field control circuit 70 in the case in which the short-circuit malfunction is caused in the capacitor 60. When the short-circuit malfunction is caused in the capacitor 60, the short-circuit current flows through the capacitor 60 and the second switching control element 58, and the short-circuit current further flows through the field current sensor 59, and consequently, the short-circuit malfunction of the capacitor 60 can be detected based on the field current information Iin input to the field control circuit 70.

The field control circuit 70 in the seventh embodiment performs the protective operation for the field drive circuit 50F when detecting the short-circuit malfunction in the capacitor 60. The protective operation is the same as the protective operation in the abnormal term T2 shown in FIG. 7. Assuming that the short-circuit malfunction of the capacitor 60 is detected with the timing t1, the first control signal FH is kept as the off-level signal OFF on and after the timing t1. The second control signal FS is switched to the off-level signal OFF with the timing t2 thereafter while keeping the first control signal FH as the off-level signal OFF. Since the short-circuit current of the capacitor 60 does not flow through the field coil 23, the short-circuit current of the capacitor 60 can be blocked by the protective operation without breaking the second switching control element 58.

In the seventh embodiment, the same advantage as in the third embodiment can be obtained, and in addition, it is possible to stabilize the voltage of the battery terminal B to stabilize the operation of the field drive circuit 50F because the capacitor 60 prevents the voltage variation in the battery terminal B caused by turning on or off of the first switching control element 53, and further, the short-circuit current of the capacitor 60 can be blocked without breaking the second switching control element 58 even in the case in which the short-circuit malfunction is caused in the capacitor 60.

Eighth Embodiment

Figure 13:
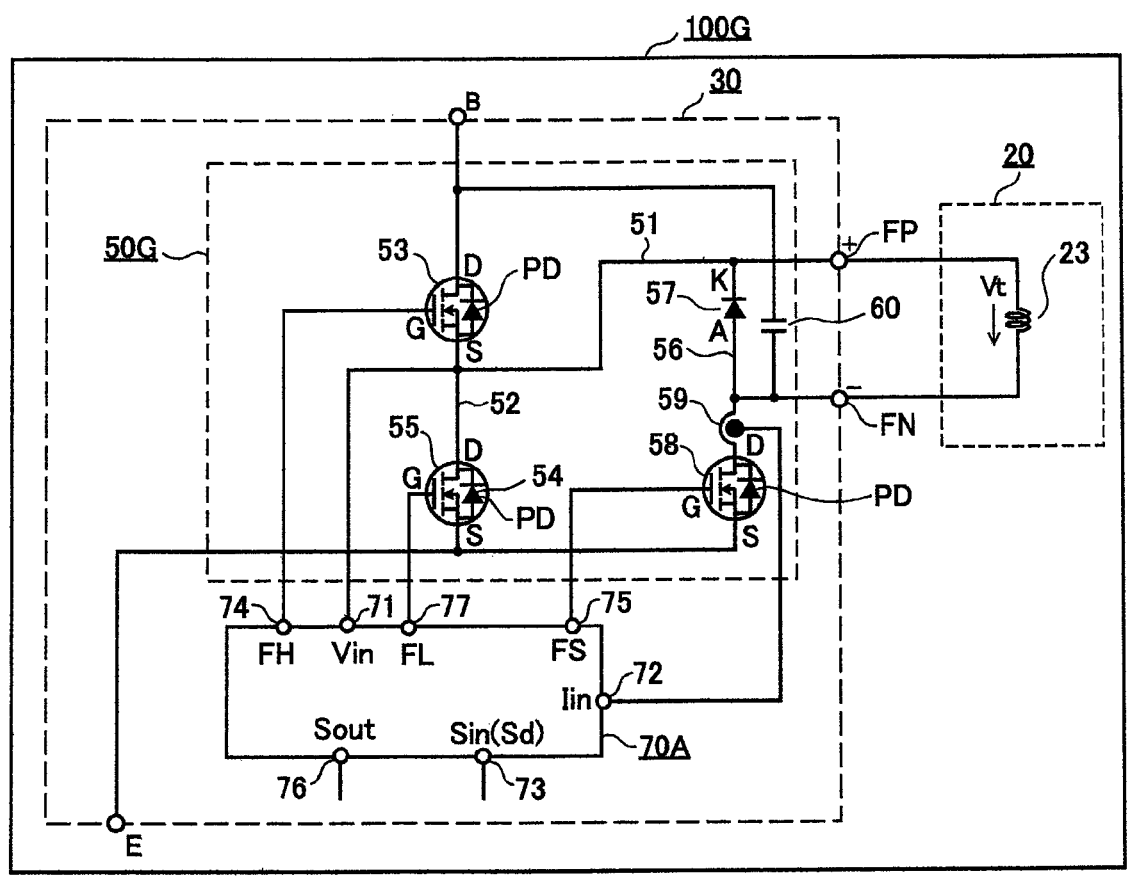
FIG. 13 is an electric diagram showing an eighth embodiment of the automotive rotary electrical apparatus according to the present invention.

FIG. 13 is an electric diagram showing an eighth embodiment of the automotive rotary electrical apparatus according to the present invention. In the automotive rotary electrical apparatus 100G in the eighth embodiment, the field drive circuit 50C in the fourth embodiment shown in FIG. 8 is replaced with a field drive circuit 50G. Other sections of the configuration are the same as those in the fourth embodiment.

The field drive circuit 50G in the eighth embodiment has a capacitor 60 in addition to the field drive circuit 50C in the fourth embodiment. Other sections of the configuration are the same as those of the field drive circuit 50C in the fourth embodiment. The capacitor 60 of the eighth embodiment is connected between the battery terminal B and the negative field terminal FN, and one end thereof is connected to the drain D of the first switching control element 53 while the other end thereof is connected to the anode A of the second diode element 57.

Similarly to the capacitor 60 in the fifth embodiment, the capacitor 60 prevents the voltage variation of the battery terminal B caused by turning on or off of the first switching control element 53 to stabilize the voltage of the battery terminal B, thereby stabilizing the operation of the field drive circuit 50G.

Further, similarly to the fifth embodiment, also in the eighth embodiment, the protective operation can be performed by the field control circuit 70A in the case in which the short-circuit malfunction is caused in the capacitor 60. When the short-circuit malfunction is caused in the capacitor 60, the short-circuit current flows through the capacitor 60 and the second switching control element 58, and the short-circuit current further flows through the field current sensor 59, and consequently, the short-circuit malfunction of the capacitor 60 can be detected based on the field current information Iin input to the field control circuit 70A.

The field control circuit 70A performs the protective operation for the field drive circuit 50G when detecting the short-circuit malfunction in the capacitor 60. The protective operation is the same as the protective operation in the abnormal term T2 shown in FIG. 9. Assuming that the short-circuit malfunction of the capacitor 60 is detected with the timing t1, the first control signal FH is kept as the off-level signal OFF on and after the timing t1, and further, the third control signal FL is switched to the off-level signal OFF with the timing t1, and kept as the off-level signal OFF on and after the timing t1. Then, the second control signal FS is switched to the off-level signal OFF with the timing t2 thereafter while keeping the first and third control signals FH, FL as the off-level signals OFF. Since the short-circuit current of the capacitor 60 does not flow through the field coil 23, the short-circuit current of the capacitor 60 can be blocked by the protective operation without breaking the second switching control element 58.

In the eighth embodiment, the same advantage as in the fourth embodiment can be obtained, and in addition, it is possible to stabilize the voltage of the battery terminal B to stabilize the operation of the field drive circuit 50G because the capacitor 60 prevents the voltage variation in the battery terminal B caused by turning on or off of the first switching control element 53, and further, the short-circuit current of the capacitor 60 can be blocked without breaking the second switching control element 58 even in the case in which the short-circuit malfunction is caused in the capacitor 60.

Ninth Embodiment

Figure 14:
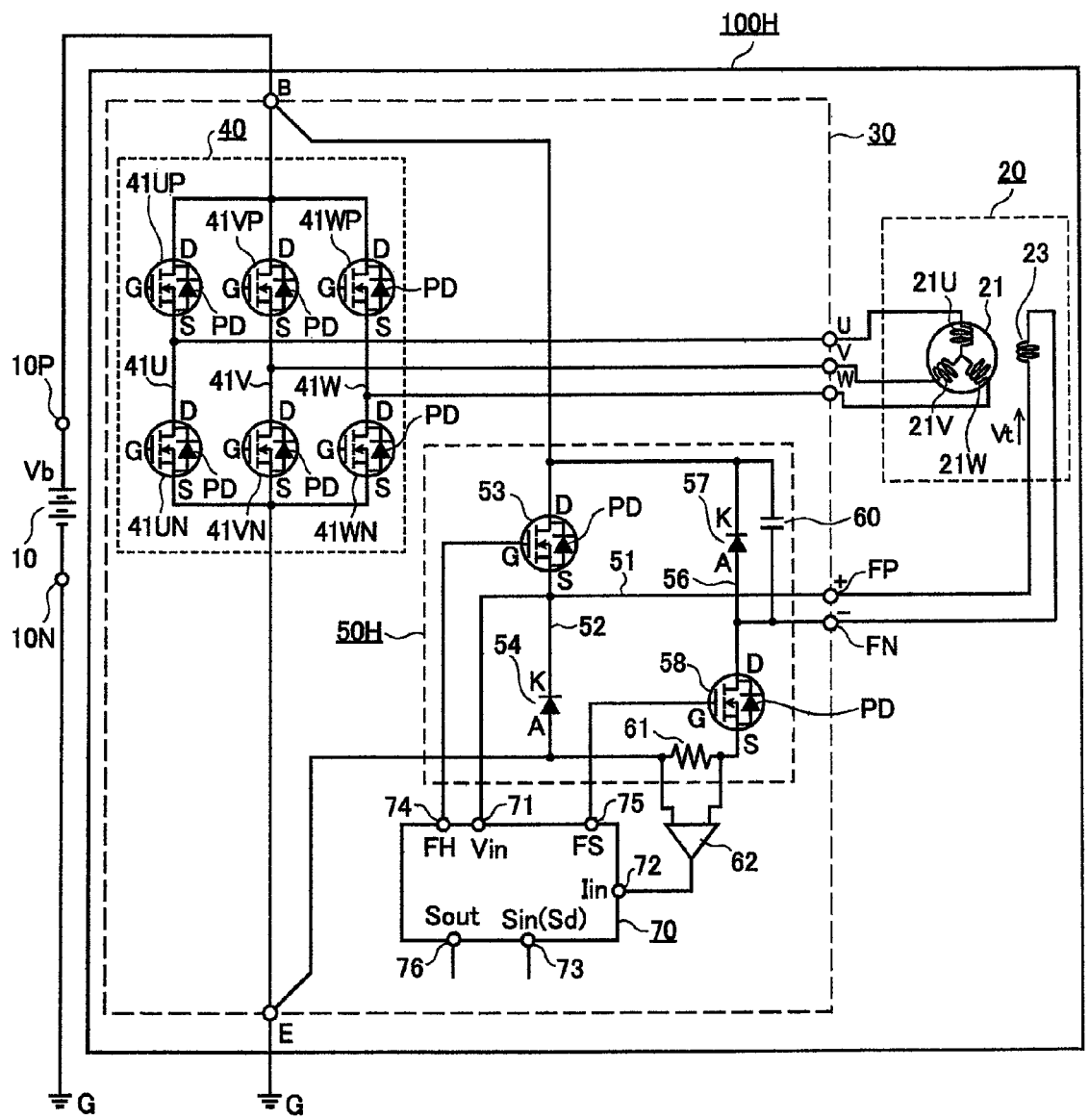
FIG. 14 is an electric diagram showing a ninth embodiment of the automotive rotary electrical apparatus according to the present invention.

FIG. 14 is an electric diagram showing a ninth embodiment of the automotive rotary electrical apparatus according to the present invention. In the automotive rotary electrical apparatus 100H in the ninth embodiment, the field drive circuit 50 in the first embodiment shown in FIG. 1 is replaced with a field drive circuit 50H. Other sections of the configuration are the same as those in the first embodiment.

In the field drive circuit 50H of the ninth embodiment, a capacitor 60 is added to the field drive circuit 50 of the first embodiment, and a field current sensing resistor 61 is used instead of the field current sensor 59. Similarly to the capacitor 60 in the fifth embodiment, the capacitor 60 is connected in parallel to the second diode element 57, and one end thereof is directly connected to the battery terminal B while the other end thereof is directly connected to the negative field terminal FN. The field current sensing resistor 61 is connected between the negative field terminal FN and the anode A of the first diode element 54 in series with the second switching control element 58 in order for sensing the current flowing from the negative field terminal FN to the first diode element 54 through the second switching control element 58 in a circuit for connecting the negative field terminal FN to the common potential terminal E. The field current sensing resistor 61 is provided with a first differential amplifier 62 attached thereto, and a pair of input terminals of the differential amplifier 62 is connected to both ends of the field current sensing resistor 61. An output terminal of the differential amplifier 62 is connected to an input terminal 72 of the field control circuit 70 to input the field current information Iin to the input terminal 72.

The capacitor 60 of the ninth embodiment is connected in parallel to the first switching control element 53 and the field coil 23, performs a charge-discharge operation through the field coil 23 in accordance with turning on and off of the first switching control element 53 to prevent the voltage variation of the battery terminal B responsive to turning on and off of the first switching control element 53 similarly to the capacitor 60 in the fifth embodiment. The field current sensing resistor 61 is not included in the charge-discharge circuit of the capacitor 60 responsive to turning on or off of the first switching control element 53, and consequently, the field current sensing resistor 61 never limits the charge-discharge current of the capacitor 60 responsive to turning on or off of the first switching control element 53.

Since the power conversion circuit 40 is connected between the battery terminal B and the common potential terminal E, in the case in which the voltage of the battery terminal B varies in response to turning on or off of each of the switching control elements 41UP, 41UN, 41VP, 41VN, 41WP, and 41WN of the power conversion circuit 40, the charge-discharge current of the capacitor 60 flows through the second switching control element 58 and the field current sensing resistor 61. As a result, the charge-discharge current of the capacitor 60 responsive to turning on or off of each of the switching control elements of the power conversion circuit 40 is suppressed by the field current sensing resistor 61 to prevent a rapid charge-discharge current from flowing, and consequently, even when each of the switching control elements of the power conversion circuit 40 is turned on or off, there is no chance of causing a noise derived therefrom in the field drive circuit 50H.

In the ninth embodiment, the same advantage as in the fifth embodiment can be obtained, and in addition, the noise derived from turning on or off of each of the switching control elements of the power conversion circuit 40 can be prevented from being caused in the field drive circuit 50H by the field current sensing resistor 61.

Tenth Embodiment

Figure 15:
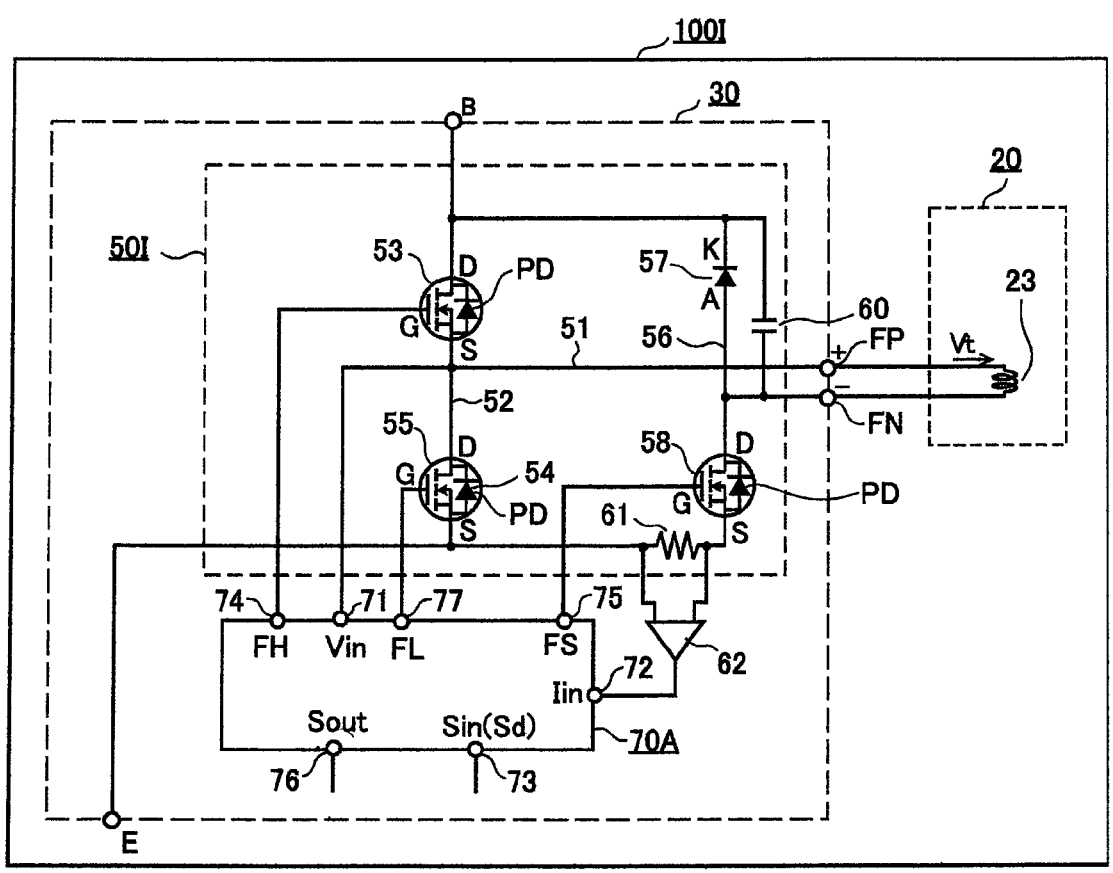
FIG. 15 is an electric diagram showing a tenth embodiment of the automotive rotary electrical apparatus according to the present invention.

FIG. 15 is an electric diagram showing a tenth embodiment of the automotive rotary electrical apparatus according to the present invention. In the automotive rotary electrical apparatus 100I in the tenth embodiment, the field drive circuit 50A in the second embodiment shown in FIG. 4 is replaced with a field drive circuit 50I. Other sections of the configuration are the same as those in the second embodiment.

In the field drive circuit 50I of the tenth embodiment, a capacitor 60 is added to the field drive circuit 50A of the second embodiment, and a field current sensing resistor 61 is used instead of the field current sensor 59. Similarly to the capacitor 60 in the fifth embodiment, the capacitor 60 is connected in parallel to the second diode element 57, and one end thereof is directly connected to the battery terminal B while the other end thereof is directly connected to the negative field terminal FN. The field current sensing resistor 61 is connected between the negative field terminal FN and the anode A of the first diode element 54 in order for sensing the current flowing from the negative field terminal FN to the third switching control element 55 through the second switching control element 58 in a circuit for connecting the negative field terminal FN to the common potential terminal E. The field current sensing resistor 61 is provided with a first differential amplifier 62 attached thereto, and a pair of input terminals of the differential amplifier 62 is connected to both ends of the field current sensing resistor 61. An output terminal of the differential amplifier 62 is connected to an input terminal 72 of the field control circuit 70A to input the field current information Iin to the input terminal 72.

The capacitor 60 of the tenth embodiment is connected in parallel to the first switching control element 53 and the field coil 23, performs a charge-discharge operation through the field coil 23 in accordance with turning on and off of the first switching control element 53 to prevent the voltage variation of the battery terminal B responsive to turning on and off of the first switching control element 53 similarly to the capacitor 60 in the fifth embodiment. The field current sensing resistor 61 is not included in the charge-discharge circuit of the capacitor 60 responsive to turning on or off of the first switching control element 53, and consequently, the field current sensing resistor 61 never limits the charge-discharge current of the capacitor 60 responsive to turning on or off of the first switching control element 53.

Since the power conversion circuit 40 is connected between the battery terminal B and the common potential terminal E, in the case in which the voltage of the battery terminal B varies in response to turning on or off of each of the switching control elements 41UP, 41UN, 41VP, 41VN, 41WP, and 41WN of the power conversion circuit 40, the charge-discharge current of the capacitor 60 flows through the second switching control element 58 and the field current sensing resistor 61. As a result, the charge-discharge current of the capacitor 60 responsive to turning on or off of each of the switching control elements of the power conversion circuit 40 is suppressed by the field current sensing resistor 61 to prevent a rapid charge-discharge current from flowing, and consequently, even when each of the switching control elements of the power conversion circuit 40 is turned on or off, there is no chance of causing a noise derived therefrom in the field drive circuit 50I.

In the tenth embodiment, the same advantage as in the sixth embodiment can be obtained, and in addition, the noise derived from turning on or off of each of the switching control elements of the power conversion circuit 40 can be prevented from being caused in the field drive circuit 50I by the field current sensing resistor 61.

Eleventh Embodiment

Figure 16:
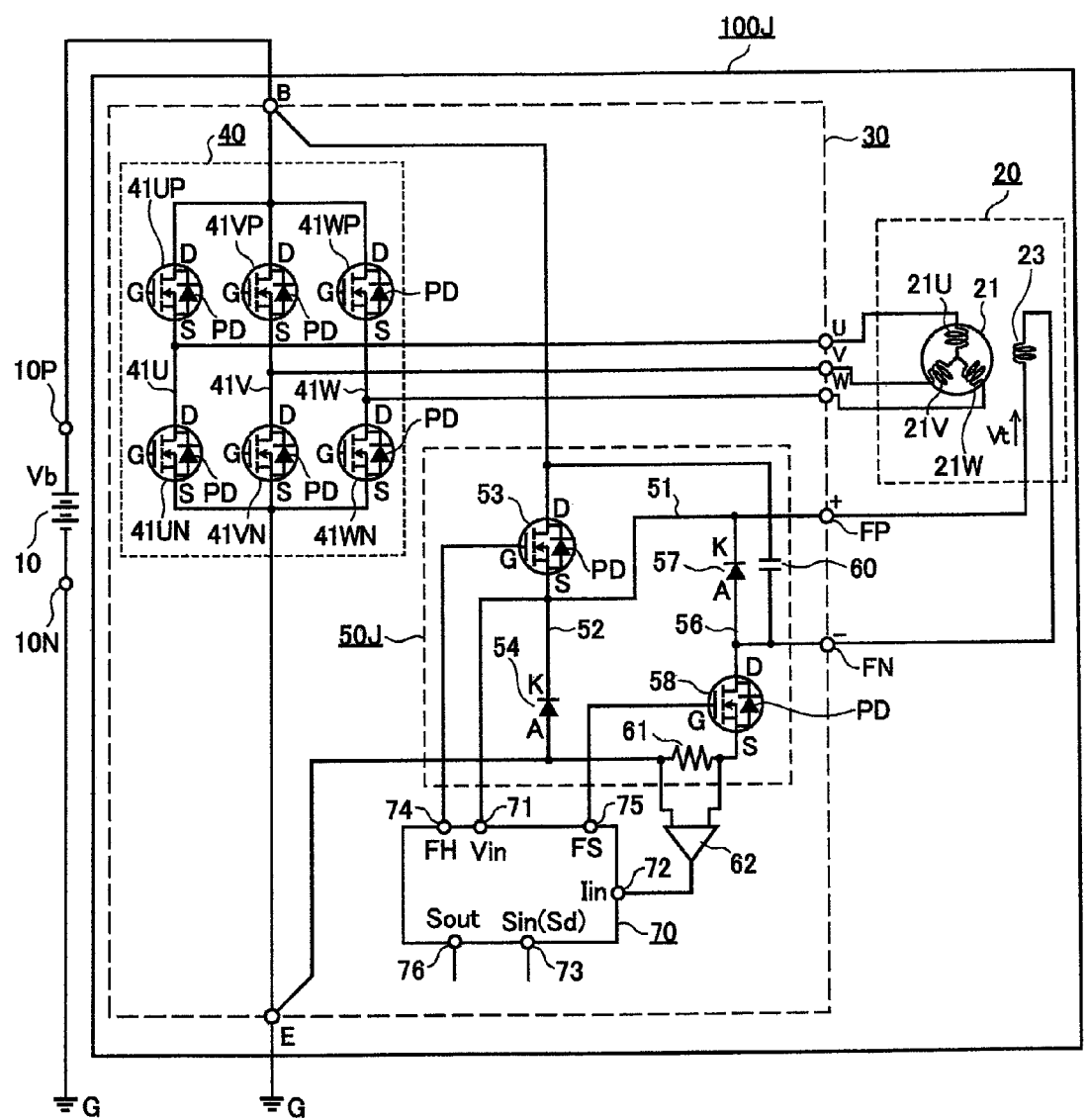
FIG. 16 is an electric diagram showing an eleventh embodiment of the automotive rotary electrical apparatus according to the present invention.

FIG. 16 is an electric diagram showing an eleventh embodiment of the automotive rotary electrical apparatus according to the present invention. In the automotive rotary electrical apparatus 100J in the eleventh embodiment, the field drive circuit 50B in the third embodiment shown in FIG. 6 is replaced with a field drive circuit 50J. Other sections of the configuration are the same as those in the third embodiment.

In the field drive circuit 50J of the eleventh embodiment, a capacitor 60 is added to the field drive circuit 50B of the third embodiment, and a field current sensing resistor 61 is used instead of the field current sensor 59. The capacitor 60 is connected between the battery terminal B and the negative field terminal FN similarly to the capacitor 60 in the seventh embodiment. The field current sensing resistor 61 is connected between the negative field terminal FN and the anode A of the first diode element 54 in order for sensing the current flowing from the negative field terminal FN to the first diode element 54 through the second switching control element 58 in a circuit for connecting the negative field terminal FN to the common potential terminal E. The field current sensing resistor 61 is provided with a first differential amplifier 62 attached thereto, and a pair of input terminals of the differential amplifier 62 is connected to both ends of the field current sensing resistor 61. An output terminal of the differential amplifier 62 is connected to an input terminal 72 of the field control circuit 70 to input the field current information Iin to the input terminal 72.

The capacitor 60 of the eleventh embodiment is connected in parallel to the first switching control element 53 and the field coil 23, performs a charge-discharge operation through the field coil 23 in accordance with turning on and off of the first switching control element 53 to prevent the voltage variation of the battery terminal B responsive to turning on and off of the first switching control element 53 similarly to the capacitor 60 in the fifth embodiment. The field current sensing resistor 61 is not included in the charge-discharge circuit of the capacitor 60 responsive to turning on or off of the first switching control element 53, and consequently, the field current sensing resistor 61 never limits the charge-discharge current of the capacitor 60 responsive to turning on or off of the first switching control element 53.

Since the power conversion circuit 40 is connected between the battery terminal B and the common potential terminal E, in the case in which the voltage of the battery terminal B varies in response to turning on or off of each of the switching control elements 41UP, 41UN, 41VP, 41VN, 41WP, and 41WN of the power conversion circuit 40, the charge-discharge current of the capacitor 60 flows through the second switching control element 58 and the field current sensing resistor 61. As a result, the charge-discharge current of the capacitor 60 responsive to turning on or off of each of the switching control elements of the power conversion circuit 40 is suppressed by the field current sensing resistor 61 to prevent a rapid charge-discharge current from flowing, and consequently, even when each of the switching control elements of the power conversion circuit 40 is turned on or off, there is no chance of causing a noise derived therefrom in the field drive circuit 50J.

In the eleventh embodiment, the same advantage as in the seventh embodiment can be obtained, and in addition, the noise derived from turning on or off of each of the switching control elements of the power conversion circuit 40 can be prevented from being caused in the field drive circuit 50J by the field current sensing resistor 61.

Twelfth Embodiment

Figure 17:
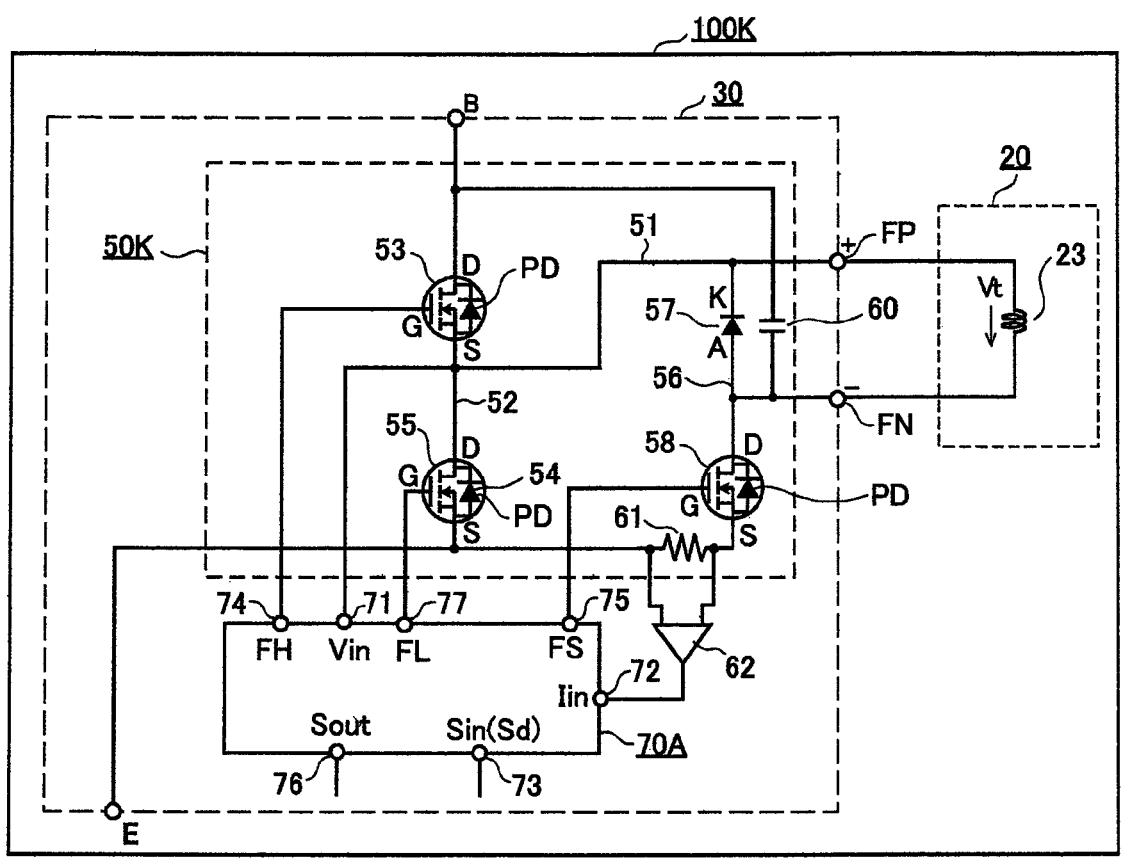
FIG. 17 is an electric diagram showing a twelfth embodiment of the automotive rotary electrical apparatus according to the present invention.

FIG. 17 is an electric diagram showing a twelfth embodiment of the automotive rotary electrical apparatus according to the present invention. In the automotive rotary electrical apparatus 100K in the twelfth embodiment, the field drive circuit 50C in the fourth embodiment shown in FIG. 8 is replaced with a field drive circuit 50K. Other sections of the configuration are the same as those in the fourth embodiment.

In the field drive circuit 50K of the twelfth embodiment, a capacitor 60 is added to the field drive circuit 50C of the fourth embodiment, and a field current sensing resistor 61 is used instead of the field current sensor 59. The capacitor 60 is connected between the battery terminal B and the negative field terminal FN similarly to the capacitor 60 in the seventh embodiment. The field current sensing resistor 61 is connected between the negative field terminal FN and the anode A of the first diode element 54 in order for sensing the current flowing from the negative field terminal FN to the third switching control element 55 through the second switching control element 58 in a circuit for connecting the negative field terminal FN to the common potential terminal E. The field current sensing resistor 61 is provided with a first differential amplifier 62 attached thereto, and a pair of input terminals of the differential amplifier 62 is connected to both ends of the field current sensing resistor 61. An output terminal of the differential amplifier 62 is connected to an input terminal 72 of the field control circuit 70A to input the field current information Iin to the input terminal 72.

The capacitor 60 of the twelfth embodiment is connected in parallel to the first switching control element 53 and the field coil 23, performs a charge-discharge operation through the field coil 23 in accordance with turning on and off of the first switching control element 53 to prevent the voltage variation of the battery terminal B responsive to turning on and off of the first switching control element 53 similarly to the capacitor 60 in the fifth embodiment. The field current sensing resistor 61 is not included in the charge-discharge circuit of the capacitor 60 responsive to turning on or off of the first switching control element 53, and consequently, the field current sensing resistor 61 never limits the charge-discharge current of the capacitor 60 responsive to turning on or off of the first switching control element 53.

Since the power conversion circuit 40 is connected between the battery terminal B and the common potential terminal E, in the case in which the voltage of the battery terminal B varies in response to turning on or off of each of the switching control elements 41UP, 41UN, 41VP, 41VN, 41WP, and 41WN of the power conversion circuit 40, the charge-discharge current of the capacitor 60 flows through the second switching control element 58 and the field current sensing resistor 61. As a result, the charge-discharge current of the capacitor 60 responsive to turning on or off of each of the switching control elements of the power conversion circuit 40 is suppressed by the field current sensing resistor 61 to prevent a rapid charge-discharge current from flowing, and consequently, even when each of the switching control elements of the power conversion circuit 40 is turned on or off, there is no chance of causing a noise derived therefrom in the field drive circuit 50K.

In the twelfth embodiment, the same advantage as in the eighth embodiment can be obtained, and in addition, the noise derived from turning on or off of each of the switching control elements of the power conversion circuit 40 can be prevented from being caused in the field drive circuit 50K by the field current sensing resistor 61.

Thirteenth Embodiment

Figure 18:
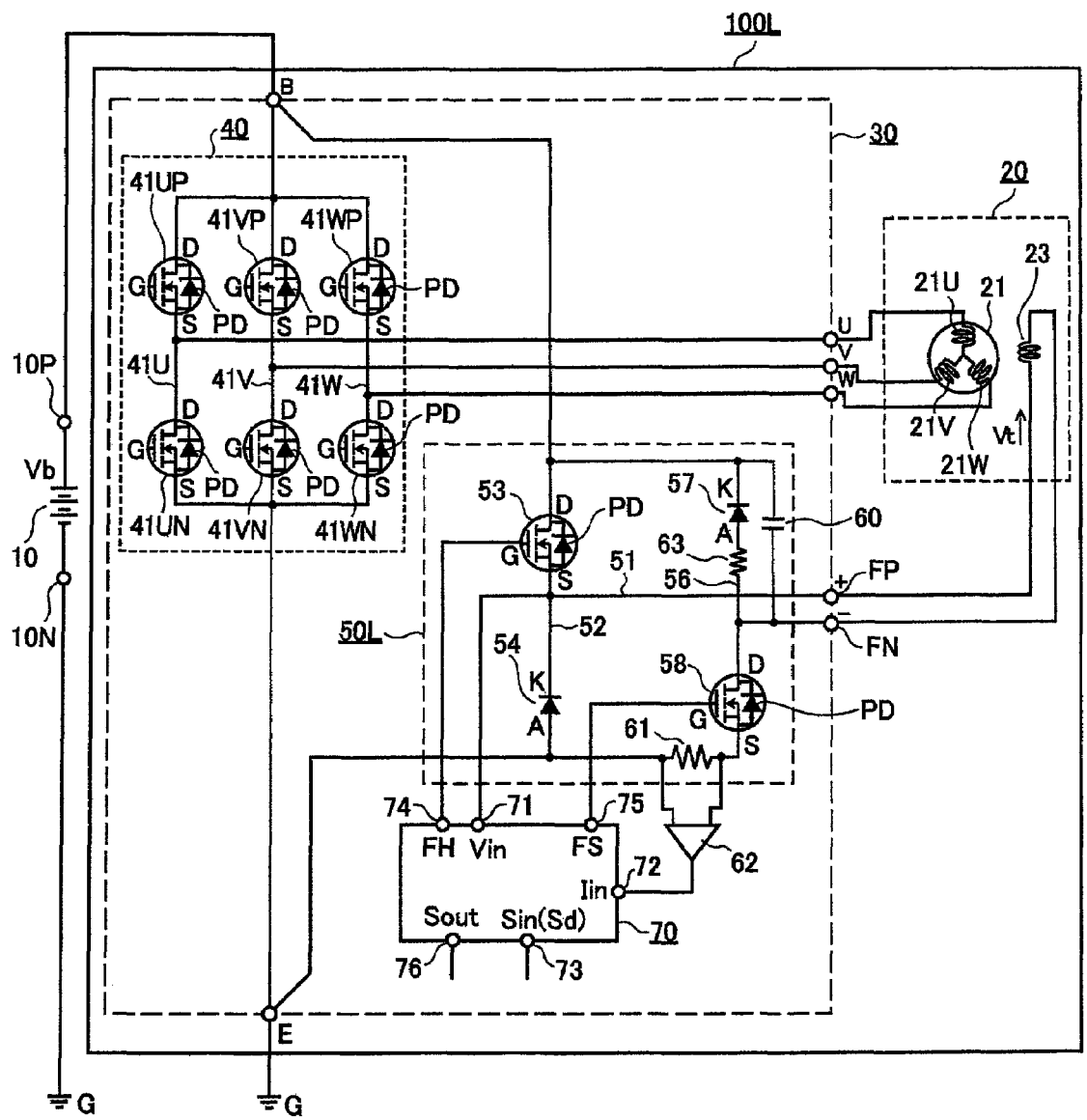
FIG. 18 is an electric diagram showing a thirteenth embodiment of the automotive rotary electrical apparatus according to the present invention.

FIG. 18 is an electric diagram showing a thirteenth embodiment of the automotive rotary electrical apparatus according to the present invention. In the automotive rotary electrical apparatus 100L in the thirteenth embodiment, the field drive circuit 50H in the ninth embodiment shown in FIG. 14 is replaced with a field drive circuit 50L. Other sections of the configuration are the same as those in the ninth embodiment.

The field drive circuit 50L in the thirteenth embodiment has a load resistor 63 in addition to the field drive circuit 50H in the ninth embodiment. Other sections of the configuration are the same as those of the field drive circuit 50H in the ninth embodiment. As shown in FIG. 18, the load resistor 63 is connected between the battery terminal B and the negative field terminal FN in series with the second diode element 57. The circulating field current based on the transient voltage Vt flows through the second diode element 57 when the second control signal FS is switched to the off-level signal OFF in the abnormal term T2, and the load resistor 63 attenuates the circulating field current to reduce the time for attenuating the circulating field current.

According to the thirteenth embodiment, the same advantage as in the ninth embodiment can be obtained, and in addition, there is obtained an advantage of reducing, by the load resistor 63, the attenuation time of the circulating field current flowing through the field coil 23 when turning off the second switching control element 58, thus making it possible to terminate the abnormal term T2 in a short period of time.

Fourteenth Embodiment

Figure 19:
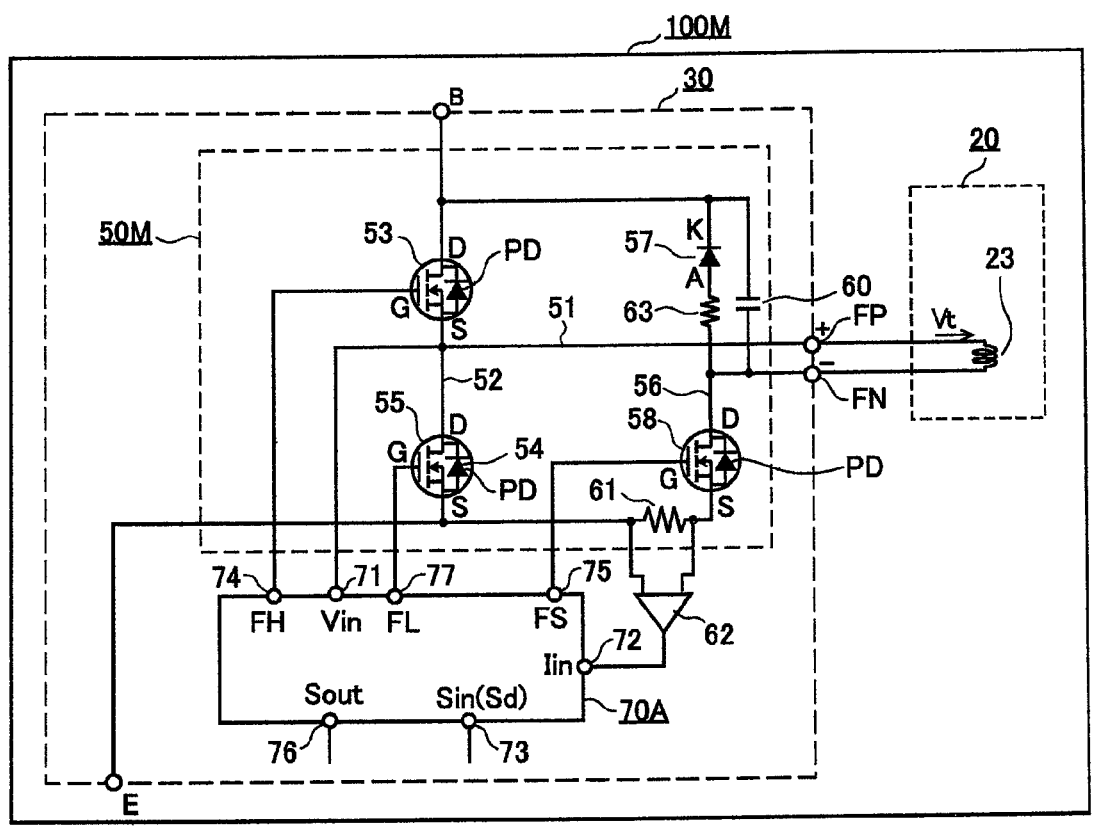
FIG. 19 is an electric diagram showing a fourteenth embodiment of the automotive rotary electrical apparatus according to the present invention.

FIG. 19 is an electric diagram showing a fourteenth embodiment of the automotive rotary electrical apparatus according to the present invention. In the automotive rotary electrical apparatus 100M in the fourteenth embodiment, the field drive circuit 50I in the tenth embodiment shown in FIG. 15 is replaced with a field drive circuit 50M. Other sections of the configuration are the same as those in the tenth embodiment.

The field drive circuit 50M in the fourteenth embodiment has a load resistor 63 in addition to the field drive circuit 50I in the tenth embodiment. Other sections of the configuration are the same as those of the field drive circuit 50I in the tenth embodiment. As shown in FIG. 19, the load resistor 63 is connected between the battery terminal B and the negative field terminal FN in series with the second diode element 57. The circulating field current based on the transient voltage Vt flows through the second diode element 57 when the second control signal FS is switched to the off-level signal OFF in the abnormal term T2, and the load resistor 63 attenuates the circulating field current to reduce the time for attenuating the circulating field current.

According to the fourteenth embodiment, the same advantage as in the tenth embodiment can be obtained, and in addition, there is obtained an advantage of reducing, by the load resistor 63, the attenuation time of the circulating field current flowing through the field coil 23 when turning off the second switching control element 58, thus making it possible to terminate the abnormal term T2 in a short period of time.

Fifteenth Embodiment

Figure 20:
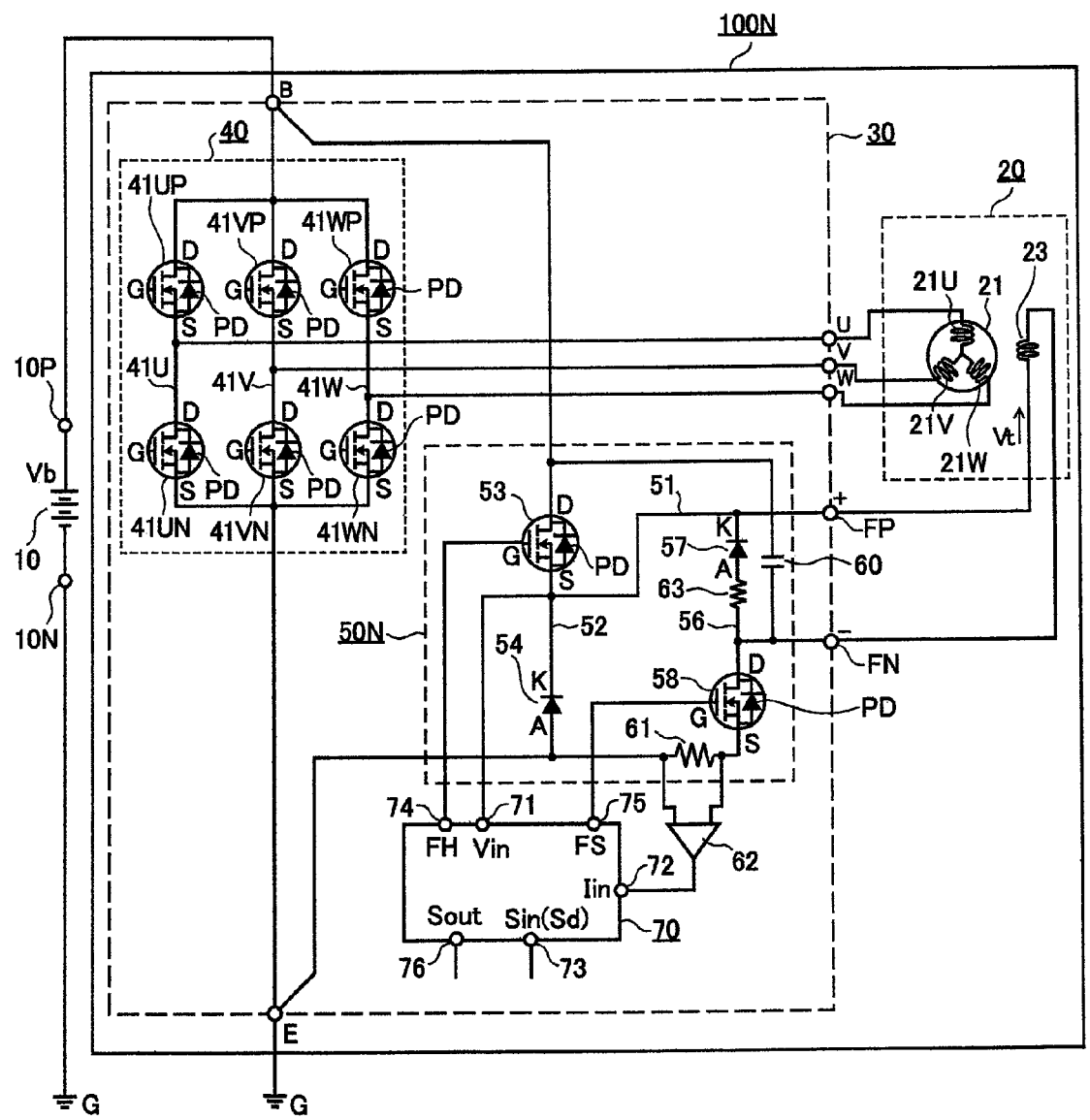
FIG. 20 is an electric diagram showing a fifteenth embodiment of the automotive rotary electrical apparatus according to the present invention.

FIG. 20 is an electric diagram showing a fifteenth embodiment of the automotive rotary electrical apparatus according to the present invention. In the automotive rotary electrical apparatus 100N in the fifteenth embodiment, the field drive circuit 50J in the eleventh embodiment shown in FIG. 16 is replaced with a field drive circuit 50N. Other sections of the configuration are the same as those in the eleventh embodiment.

The field drive circuit 50N in the fifteenth embodiment has a load resistor 63 in addition to the field drive circuit 50J in the eleventh embodiment. Other sections of the configuration are the same as those of the field drive circuit 50J in the eleventh embodiment. As shown in FIG. 20, the load resistor 63 is connected between the positive field terminal FP and the negative field terminal FN in series with the second diode element 57. The circulating field current based on the transient voltage Vt flows through the second diode element 57 when the second control signal FS is switched to the off-level signal OFF in the abnormal term T2, and the load resistor 63 attenuates the circulating field current to reduce the time for attenuating the circulating field current.

According to the fifteenth embodiment, the same advantage as in the eleventh embodiment can be obtained, and in addition, there is obtained an advantage of reducing, by the load resistor 63, the attenuation time of the circulating field current flowing through the field coil 23 when turning off the second switching control element 58, thus making it possible to terminate the abnormal term T2 in a short period of time.

Sixteenth Embodiment

Figure 21:
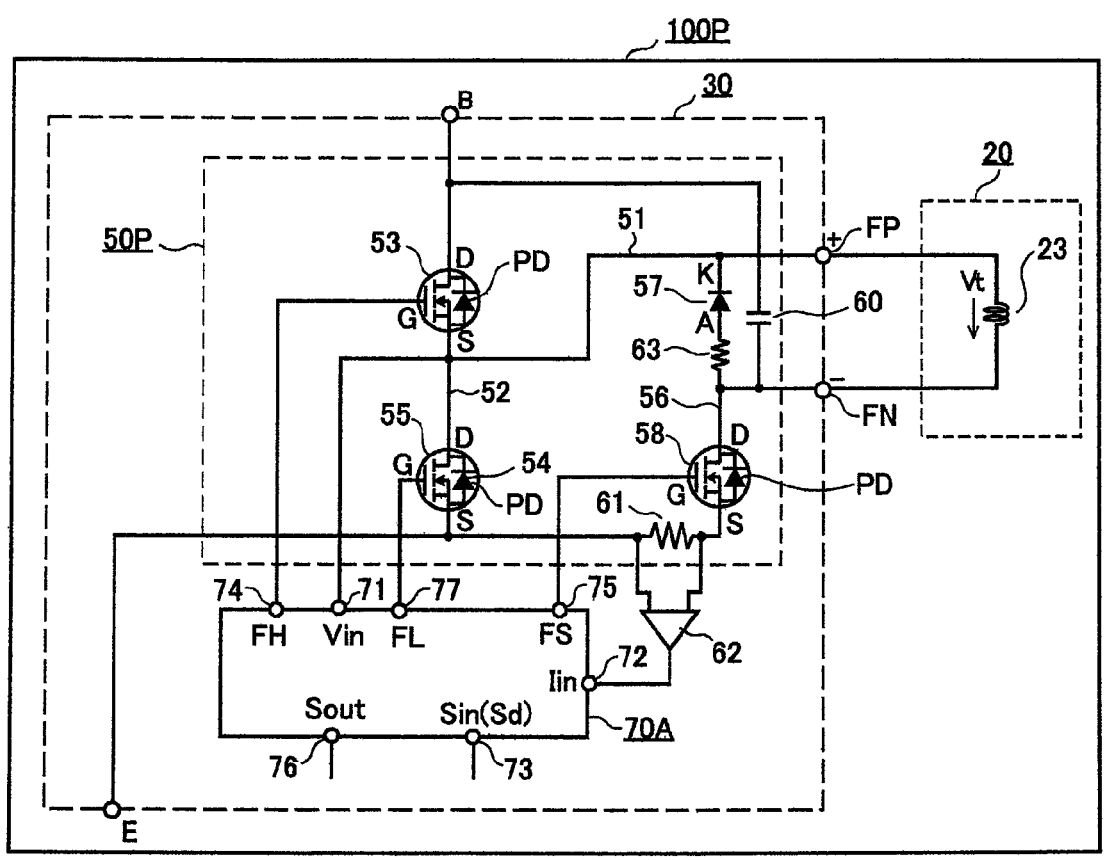
FIG. 21 is an electric diagram showing a sixteenth embodiment of the automotive rotary electrical apparatus according to the present invention.

FIG. 21 is an electric diagram showing a sixteenth embodiment of the automotive rotary electrical apparatus according to the present invention. In the automotive rotary electrical apparatus 100P in the sixteenth embodiment, the field drive circuit 50K in the twelfth embodiment shown in FIG. 17 is replaced with a field drive circuit 50P. Other sections of the configuration are the same as those in the twelfth embodiment.

The field drive circuit 50P in the sixteenth embodiment has a load resistor 63 in addition to the field drive circuit 50K in the twelfth embodiment. Other sections of the configuration are the same as those of the field drive circuit 50K in the twelfth embodiment. As shown in FIG. 21, the load resistor 63 is connected between the positive field terminal FP and the negative field terminal FN in series with the second diode element 57. The circulating field current based on the transient voltage Vt flows through the second diode element 57 when the second control signal FS is switched to the off-level signal OFF in the abnormal term T2, and the load resistor 63 attenuates the circulating field current to reduce the time for attenuating the circulating field current.

According to the sixteenth embodiment, the same advantage as in the twelfth embodiment can be obtained, and in addition, there is obtained an advantage of reducing, by the load resistor 63, the attenuation time of the circulating field current flowing through the field coil 23 when turning off the second switching control element 58, thus making it possible to terminate the abnormal term T2 in a short period of time.

Seventeenth Embodiment

Figure 22:
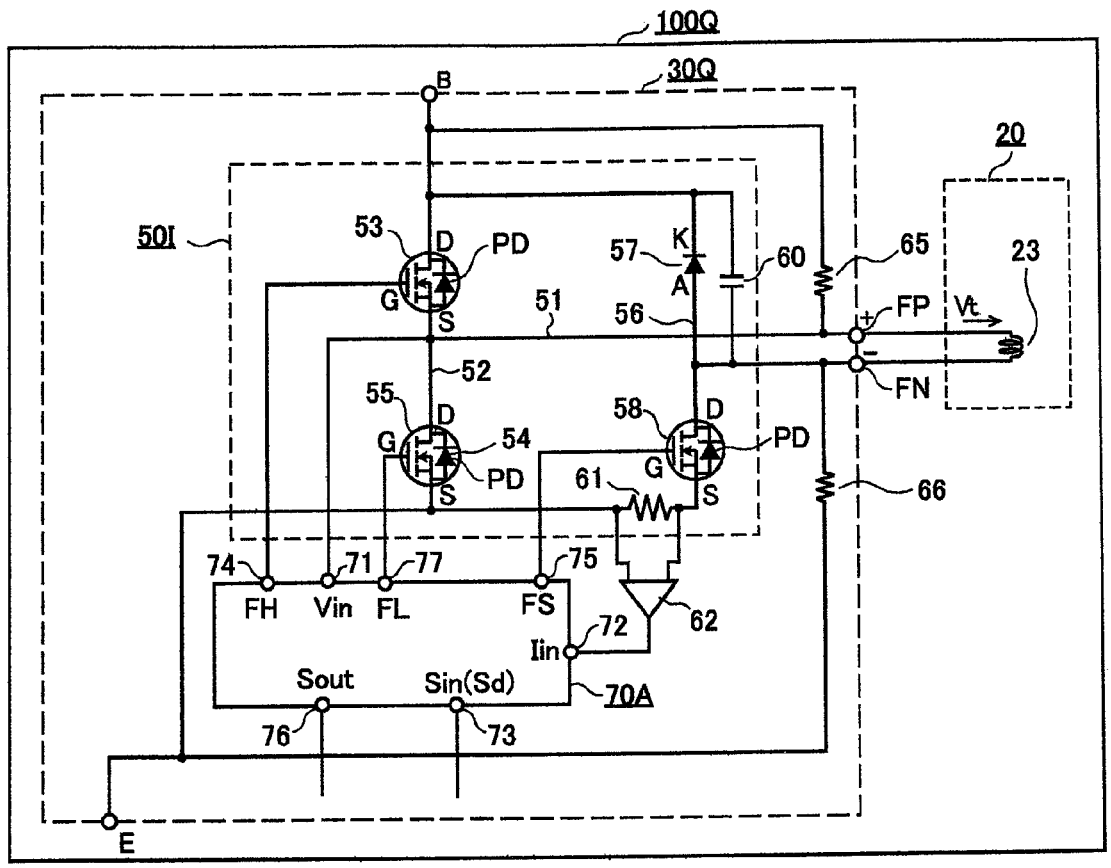
FIG. 22 is an electric diagram showing a seventeenth embodiment of the automotive rotary electrical apparatus according to the present invention.

FIG. 22 is an electric diagram showing a seventeenth embodiment of the automotive rotary electrical apparatus according to the present invention. In the automotive rotary electrical apparatus 100Q according to the seventeenth embodiment, the control device 30 in the tenth embodiment shown in FIG. 15 is replaced with a control device 30Q. Other sections of the configuration are the same as those in the tenth embodiment.

The control device 30Q in the seventeenth embodiment has a pull-up resistor 65 and a pull-down resistor 66 in addition to the control device 30 in the tenth embodiment. Other sections of the configuration are the same as those of the control device 30 in the tenth embodiment. The control device 30Q in the seventeenth embodiment includes the field drive circuit 50I and the field control circuit 70A. The pull-up resistor 65 is connected between the battery terminal B and the positive field terminal FP, and the pull-down resistor 66 is connected between the negative field terminal FN and the common potential terminal E. The pull-up resistor 65 and the pull-down resistor 66 are each a resistor with a resistance as high as, for example, 1 kΩ or higher, not to influence the control device 30Q while the field current is flowing through the field coil 23 in the normal term T1 and the abnormal terms T2, T3, and is used for detecting an abnormal condition of the feeder circuit 51 for the field coil 23, namely the field drive circuit 50I and the field coil 23 by the field voltage information Vin while all of the switching control elements 53, 55, 58 of the field drive circuit 50I are turned off.

When no malfunction is caused in the feeder circuit 51 for the field coil 23, the field voltage information Vin takes the following predetermined value Vin0 in the condition in which all of the switching control elements 53, 55, 58 are turned off.

$$Vin0 = r1 \times Vb/(r1+r2)$$

It should be noted that r1 is a resistance of the pull-up resistor 65, r2 is a resistance of the pull-down resistor 66, and the resistance of the field coil 23, which is generally a few ohms, is sufficiently lower in comparison with those of the pull-up resistor 65 and the pull-down resistor 66, and is therefore neglected. Further, Vb is the voltage of the in-vehicle battery 10.

If the first type malfunction, namely the short-to-power malfunction of the positive field terminal FP or the short-circuit malfunction of the first switching control element 53 occurs, the field voltage information Vin becomes higher than the predetermined value Vin0, and if the second type malfunction, namely the short-to-ground malfunction of the negative field terminal FN occurs, the field voltage information Vin becomes lower than the predetermined value Vin0. Therefore, in the seventeenth embodiment, by detecting the field voltage information Vin with the field control circuit 70A prior to applying current to the field coil 23, and then comparing the field voltage information Vin with the predetermined value Vin0, whether or not the first type malfunction or the second type malfunction has occurred can be judged prior to applying the field current, and the field current is then supplied to the field coil 23 only when no such malfunctions have occurred, thus the reliability of the feeder circuit 51 can be improved.

It should be noted that although in the seventeenth embodiment the pull-up resistor 65 and the pull-down resistor 66 are added to the control device 30 in the tenth embodiment, it is also possible to add the pull-up resistor 65 and the pull-down resistor 66 to the control device 30 in any other embodiments, and also in such cases, the same advantage as in the seventeenth embodiment can be obtained.

Eighteenth Embodiment

Figure 23:
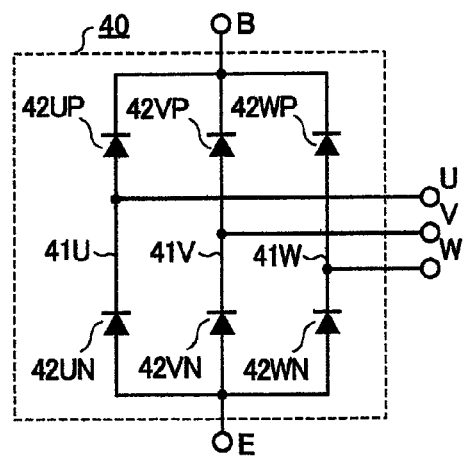
FIG. 23 is an electric diagram showing a power converter circuit used in an eighteenth embodiment of the automotive rotary electrical apparatus according to the present invention.

Although the first through seventeenth embodiments each have a motor-generator serving as both an electric motor and a generator as the rotary electric machine 20, and the power conversion circuit 40 including the six switching control elements 41UP, 41UN, 41VP, 41VN, 41WP, and 41WN and performing power running control and synchronous rectifying control for the rotary electric machine 20, the power conversion circuit 40 can be configured as a three-phase full-wave rectifying circuit as shown in FIG. 23 in the case in which the rotary electric machine 20 is used as an exclusive generator. In the power conversion circuit 40 shown in FIG. 23, the U-phase cable 41U includes a positive side diode element 42UP and a negative side diode element 42UN, and the connection point therebetween is connected to the U-terminal. The V-phase cable 41V includes a positive side diode element 42VP and a negative side diode element 42VN, and the connection point therebetween is connected to the V-terminal. Further, the W-phase cable 41W includes a positive side diode element 42WP and a negative side diode element 42WN, and the connection point therebetween is connected to the W-terminal.

Various modifications and alterations of this invention will be apparent to those skilled in the art without departing from the scope and spirit of this invention, and it should be understood that this is not limited to the illustrative embodiments set forth herein.

The automotive rotary electrical apparatus according to the invention can be applied as an automotive motor-generator or an automotive generator, and the control device thereof.

What is claimed is:

1. An automotive rotary electrical apparatus comprising:
    a rotary electric machine having an armature coil and a field coil, and coupled to an engine mounted on a vehicle; and
    a control device having
        a battery terminal connected to a positive terminal of an in-vehicle battery,
        a common potential terminal connected to a common potential point,
        a positive field terminal and a negative field terminal connected to the field coil,
        a power conversion circuit connected between the battery terminal and the common potential terminal, and for performing power conversion between the in-vehicle battery and the armature coil,
        a field drive circuit connected between the battery terminal and the common potential terminal, and for forming a feeder circuit for the field coil, the feeder circuit including the positive field terminal and the negative field terminal, and
        a field control circuit for controlling the field drive circuit,
    wherein the field drive circuit has
        a first switching control element connected between the battery terminal and the positive field terminal,
        a second switching control element connected between the negative field terminal and the common potential terminal,
        a first diode element connected between the positive field terminal and the common potential terminal so that a cathode of the first diode element is connected to the positive field terminal, and
        a second diode element connected between the battery terminal and the negative field terminal so that a cathode of the second diode element is connected to the battery terminal,
    wherein the field control circuit is configured so as to supply the first switching control element with a first control signal including an on-level signal for turning on the first switching control element and an off-level signal for turning off the first switching control element, and to supply the second switching control element with a second control signal including an on-level signal for turning on the second switching control element and an off-level signal for turning off the second switching control element, wherein in a case in which the feeder circuit for the field circuit is normal, the field control circuit controls the second switching control element to be an always-on state by controlling the second control signal to be kept as the on-level signal, and performs on/off control of the first switching control element at a controlled duty ratio by controlling the first control signal to repeat alternating between the on-level signal and the off-level signal at the controlled duty ratio, and wherein in a case in which one of a short-to-power malfunction of the positive field terminal and a short-circuit malfunction of the first switching control element has occurred in the feeder circuit for the field coil, the field control circuit switches the first control signal to the on-level signal while keeping the second control signal as the on-level signal, then switches the second control signal to the off-level signal while keeping the first control signal as the on-level signal, and further switches the first control signal to the off-level signal while keeping the second control signal to the off-level signal.

2. The automotive rotary electrical apparatus according to claim 1,
wherein, in a case in which a short-to-ground malfunction of the negative field terminal has occurred in the feeder circuit for the field coil, the field control circuit controls the first control signal to be kept as the off-level, and switches the second control signal to the off-level signal.

3. The automotive rotary electrical apparatus according to claim 1,
wherein the field drive circuit further includes a third switching control element connected in parallel to the first diode element, and
the field control circuit is configured so as to further supply the third switching control element with a third control signal including an on-level signal for turning on the third switching control element and an off-level signal for turning off the third switching control element,
wherein in the case in which the feeder circuit for the field coil is normal, the field control circuit performs on/off control of the third switching control element at the controlled duty ratio in a reversed state from a state of the first switching control element by controlling the third control signal to repeat alternating between the on-level signal and the off-level signal at the controlled duty ratio in a reversed state from a state of the first control signal, and
wherein in the case in which one of the short-to-power malfunction of the positive field terminal and the short-circuit malfunction of the first switching control element has occurred, the field control circuit controls the third control signal to be kept as the off-level signal.

4. The automotive rotary electrical apparatus according to claim 3,
wherein the first diode element is built-in inside a semiconductor chip forming the third switching control element.

5. The automotive rotary electrical apparatus according to claim 1, further comprising
a capacitor connected between the battery terminal and the negative field terminal.

6. The automotive rotary electrical apparatus according to claim 5, further comprising
a resistor connected between the negative field terminal and an anode of the first diode element in series with the second switching control element.

7. The automotive rotary electrical apparatus according to claim 6, further comprising
a load resistor connected between the battery terminal and the negative field terminal in series with the second diode element.

8. The automotive rotary electrical apparatus according to claim 1, further comprising:
a pull-up resistor connected between the battery terminal and the positive field terminal; and
a pull-down resistor connected between the negative field terminal and the common potential terminal.

9. The automotive rotary electrical apparatus according to claim 1,
wherein the armature coil is formed as a three-phase armature coil, and the power conversion circuit is formed as a three-phase full-wave rectifying circuit.

10. An automotive rotary electrical apparatus comprising:
a rotary electric machine having an armature coil and a field coil, and coupled to an engine mounted on a vehicle; and
a control device having
a battery terminal connected to a positive terminal of an in-vehicle battery,
a common potential terminal connected to a common potential point,
a positive field terminal and a negative field terminal connected to the field coil,
a power conversion circuit connected between the battery terminal and the common potential terminal, and for performing power conversion between the in-vehicle battery and the armature coil,
a field drive circuit connected between the battery terminal and the common potential terminal, and for forming a feeder circuit for the field coil, the feeder circuit including the positive field terminal and the negative field terminal, and
a field control circuit for controlling the field drive circuit,
wherein the field drive circuit has
a first switching control element connected between the battery terminal and the positive field terminal,
a second switching control element connected between the negative field terminal and the common potential terminal,
a first diode element connected between the positive field terminal and the common potential terminal so that a cathode of the first diode element is connected to the positive field terminal, and
a second diode element connected between the positive field terminal and the negative field terminal so that a cathode of the second diode element is connected to the positive field terminal,
wherein the field control circuit is configured so as to supply the first switching control element with a first control signal including an on-level signal for turning on the first switching control element and an off-level signal for turning off the first switching control element, and to supply the second switching control element with a second control signal including an on-level signal for turning on the second switching control element and an off-level signal for turning off the second switching control element, wherein in a case in which the feeder circuit for the field coil is normal, the field control circuit controls the second switching control element to be an always-on state by controlling the second control signal to be kept as the on-level signal, and performs on/off control of the first switching control element at a controlled duty ratio by controlling the first control signal to repeat alternating between the on-level signal and the off-level signal at the controlled duty ratio, and wherein in a case in which one of a short-to-power malfunction of the positive field terminal and a short-circuit malfunction of the first switching control element has occurred in the feeder circuit for the field coil, the field control circuit controls the first control signal to be kept as the off-level signal, and then switches the second control signal to the off-level signal while keeping the first control signal as the off-level signal.

11. The automotive rotary electrical apparatus according to claim 10, wherein in a case in which a short-to-ground malfunction of the negative field terminal has occurred in the feeder circuit for the field coil, the field control circuit controls the first control signal to be kept as the off-level, and switches the second control signal to the off-level signal.

12. The automotive rotary electrical apparatus according to claim 10, wherein the field drive circuit further includes a third switching control element connected in parallel to the first diode element, and the field control circuit is configured so as to further supply the third switching control element with a third control signal including an on-level signal for turning on the third switching control element and an off-level signal for turning off the third switching control element, wherein in the case in which the feeder circuit for the field coil is normal, the field control circuit performs on/off control of the third switching control element at the controlled duty ratio in a reversed state from a state of the first switching control element by controlling the third control signal to repeat alternating between the on-level signal and the off-level signal at the controlled duty ratio in a reversed state from a state of the first control signal, and wherein in the case in which one of the short-to-power malfunction of the positive field terminal and the short-circuit malfunction of the first switching control element has occurred, the field control circuit controls the third control signal to be kept as the off-level signal.

13. The automotive rotary electrical apparatus according to claim 12, wherein the first diode element is built-in inside a semiconductor chip forming the third switching control element.

14. The automotive rotary electrical apparatus according to claim 10, further comprising a capacitor connected between the battery terminal and the negative field terminal.

15. The automotive rotary electrical apparatus according to claim 14, further comprising a resistor connected between the negative field terminal and an anode of the first diode element in series with the second switching control element.

16. The automotive rotary electrical apparatus according to claim 15, further comprising a load resistor connected between the battery terminal and the negative field terminal in series with the second diode element.

17. The automotive rotary electrical apparatus according to claim 10, further comprising:

a pull-up resistor connected between the battery terminal and the positive field terminal; and a pull-down resistor connected between the negative field terminal and the common potential terminal.

18. The automotive rotary electrical apparatus according to claim 10, wherein the armature coil is formed as a three-phase armature coil, and the power conversion circuit is formed as a three-phase full-wave rectifying circuit.

* * * * *